(12) United States Patent
Sakai et al.

(10) Patent No.: US 9,519,109 B2
(45) Date of Patent: Dec. 13, 2016

(54) SUBSTRATE WITH LENS AND PRODUCTION METHOD THEREFOR, AND OPTICAL WAVEGUIDE WITH LENS

(71) Applicant: HITACHI CHEMICAL COMPANY, LTD., Tokyo (JP)

(72) Inventors: Daichi Sakai, Tsukuba (JP); Toshihiro Kuroda, Oyama (JP); Masao Uchigasaki, Tsukuba (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/422,710

(22) PCT Filed: Aug. 21, 2013

(86) PCT No.: PCT/JP2013/072326
§ 371 (c)(1),
(2) Date: Feb. 20, 2015

(87) PCT Pub. No.: WO2014/030680
PCT Pub. Date: Feb. 27, 2014

(65) Prior Publication Data
US 2015/0234125 A1  Aug. 20, 2015

(30) Foreign Application Priority Data
Aug. 21, 2012 (JP) ................. 2012-182152

(51) Int. Cl.
*G02B 6/12* (2006.01)
*G02B 6/32* (2006.01)
(Continued)

(52) U.S. Cl.
CPC ............. *G02B 6/32* (2013.01); *B32B 37/24* (2013.01); *B32B 38/0008* (2013.01); *G02B 3/00* (2013.01);
(Continued)

(58) Field of Classification Search
USPC .......................................................... 385/88
See application file for complete search history.

(56) References Cited

U.S. PATENT DOCUMENTS

2002/0118907 A1* 8/2002 Sugama ............. G02B 6/12002
385/14
2004/0165835 A1  8/2004 Kaneko
(Continued)

FOREIGN PATENT DOCUMENTS

JP  62-83337 A  4/1987
JP  2004-241631 A  8/2004
(Continued)

OTHER PUBLICATIONS

Office Action of CN Application No. 201380044191.5 dated Oct. 10, 2015.
(Continued)

*Primary Examiner* — Sung Pak
(74) *Attorney, Agent, or Firm* — Fitch, Even, Tabin & Flannery, LLP

(57) ABSTRACT

Provided is a substrate with a lens, including: a substrate; a columnar member provided on one surface side of the substrate; and a lens member provided on the columnar member. While arbitrarily selecting the height of the lens, the lens is formed in a uniform and desired shape. Thus, the distance between the lens and another optical member can be reduced and the pitch of the lens can be reduced.

6 Claims, 12 Drawing Sheets

(51) Int. Cl.
*G02B 3/00* (2006.01)
*G02B 7/02* (2006.01)
*B32B 37/24* (2006.01)
*B32B 38/00* (2006.01)

(52) U.S. Cl.
CPC ........... *G02B 7/02* (2013.01); *B32B 2037/243* (2013.01); *B32B 2307/412* (2013.01); *B32B 2551/00* (2013.01)

(56) References Cited

U.S. PATENT DOCUMENTS

| | | | | |
|---|---|---|---|---|
| 2007/0058068 | A1* | 3/2007 | Fukuyoshi | H01L 27/14627 348/335 |
| 2008/0158683 | A1* | 7/2008 | Yun | B29D 11/00365 359/620 |
| 2008/0186585 | A1* | 8/2008 | Mino | G02B 3/0012 359/620 |
| 2011/0080657 | A1* | 4/2011 | Takai | G02B 6/4206 359/742 |
| 2013/0259430 | A1* | 10/2013 | Tanaka | G02B 6/3628 385/88 |

FOREIGN PATENT DOCUMENTS

| | | |
|---|---|---|
| JP | 2004-361858 A | 12/2004 |
| JP | 2005-266119 | 9/2005 |
| JP | 2006-11210 A | 1/2006 |
| JP | 2006-308960 | 11/2006 |
| WO | WO 2007/105419 A1 | 9/2007 |

OTHER PUBLICATIONS

International Search Report, PCT/JP2013/072326, Dec. 3, 2013.
Popovic et al., Technique for Monolithic Fabrication of Microlens Arrays, Applied Optics, Apr. 1, 1988, vol. 27, No. 7 in English.
Office Action of CN Appln. No. 201380044191.5 dated Apr. 29, 2016.

* cited by examiner (a)

(b)

(c)

(d)

(a)

(b)

(c)

(d)

(a)

(b)

(c)

(d)

(e)

SUBSTRATE WITH LENS AND PRODUCTION METHOD THEREFOR, AND OPTICAL WAVEGUIDE WITH LENS

TECHNICAL FIELD

The present invention relates to a substrate with a lens, which includes a substrate and an optical lens formed thereon, a method of producing the substrate with a lens, an optical waveguide with a lens, which includes the substrate with a lens, and a resin film for forming a curved surface shape pattern, which enables formation of a lens or the like.

BACKGROUND ART

In an IC technology and an LSI technology, for the purpose of improving operating speed and scale of integration, part of electrical wiring on an electrical wiring board is replaced with optical wiring such as an optical fiber or an optical waveguide, and an optical signal is used instead of an electrical signal.

For example, Patent Literature 1 discloses that an optical waveguide film is provided above an IC chip having an optical element provided thereon and optical communication is carried out between the IC chip and the optical waveguide film. However, when optical communication is carried out between a substrate including optical communication means such as an optical element and optical communication means such as an optical waveguide as in Patent Literature 1, there are problems in that, unless these optical communication means are positioned with high accuracy in mounting, the optical communication cannot be carried out, and in that, without light concentration, optical loss increases to reduce signal strength.

In order to solve these problems, a microlens is provided on a surface of the substrate. As a method of producing such a microlens with ease, for example, as described in Patent Literature 2, a method using so-called thermal sagging is known. Specifically, a photosensitive resin resist is formed on a front surface of a transparent substrate, and a light shielding film having an opening portion formed therein is formed on a rear surface of the substrate. Then, light is radiated from the light shielding film side to expose a portion of the photosensitive resin resist which exists at a location opposed to the opening portion in the light shielding film. After that, development is carried out to form a columnar resist structure. After that, by heating the resist structure to cause thermal sagging of a surface of the resist structure, the microlens is produced.

Further, as another method of producing a microlens with ease, a method of forming the microlens by dropping a liquid droplet of a resin on a substrate is also known.

CITATION LIST

Patent Literature

Patent Literature 1: JP 2006-11210 A
Patent Literature 2: JP 2004-361858 A

SUMMARY OF THE INVENTION

Problem to be Solved by the Invention

However, when a lens is directly formed on a surface of a substrate as in Patent Literature 2, there is a problem in that, due to minute unevenness on the surface of the substrate, variations in wettability of the surface of the substrate, difference in surface tension between the surface of the substrate and a material forming a lens member, and the like, it is difficult to form the lens in a uniform shape and a plurality of lens members cannot be formed with a small pitch.

Further, in order to reduce optical loss, it is thought to increase a thickness of the lens member provided on the substrate to reduce a distance between the lens member and another optical member optically connected to the lens member. However, in the case of a lens produced by thermal sagging as in Patent Literature 2, an increased thickness of the lens results in a reduced curvature of a lens surface, and thus, in order to maintain the curvature as appropriate, it is indispensable to increase a diameter, which further makes it difficult to reduce the pitch.

These problems are not solely for the case of a lens member using thermal sagging as in Patent Literature 2, and arise similarly in the case of a lens member formed by dropping a liquid droplet of a resin on a substrate, and in the case of a lens member formed on a substrate itself by anisotropic etching after a resist in the shape of a lens is formed. Further, as another lens member, there is a microlens in which a convex lens protrudes from a base by injection molding, but, in this case, the lens member becomes thicker by a thickness of the base, and thus, there is a problem in that, when a substrate and the lens member are combined, the thickness becomes larger.

Therefore, hitherto, it has been difficult to, in a simple way, arbitrarily select a height of a lens, and, at the same time, form the lens in a uniform and desired shape. Further, it has been difficult to, for example, reduce a distance between the lens and another optical member and to reduce the pitch of the lens.

The present invention has been made to solve the problems described above, and an object of the present invention is to provide a substrate with a lens, which can, while arbitrarily selecting the height of the lens, form the lens in a uniform and desired shape, thereby enabling reduction of the distance between the lens and another optical member and reduction of the pitch of the lens. Another object of the present invention is to provide a method of producing a substrate with a lens, which enables formation of a lens in a desired shape on an arbitrary substrate, and further, a method of producing a curved surface shape pattern, and a resin film for forming a curved surface shape pattern, which enables production of the curved surface shape pattern with ease.

Means for Solving the Problem

As a result of earnest studies by the inventors of the present invention, it has been found that, by providing a lens member on a columnar member under a state in which the columnar member is provided on a substrate, the problems described above can be solved, and the present invention has been reached.

That is, the present invention provides the following Items [1] to [33]:

[1] A substrate with a lens, including: a substrate; a columnar member provided on one surface side of the substrate; and a lens member provided on the columnar member.

[2] A substrate with a lens according to Item [1], in which the columnar member protrudes from the one surface of the substrate.

[3] A substrate with a lens according to Item [1] or [2], in which the columnar member is formed of a transparent material.

[4] A substrate with a lens according to any one of Items [1] to [3], in which the substrate includes a through hole, in which the columnar member is formed so that part thereof is arranged in the through hole and another part thereof protrudes from the one surface of the substrate, and in which the substrate with a lens further includes a transparent member arranged in the through hole on the another surface side of the substrate with respect to the columnar member.

[5] A substrate with a lens according to Item [4], in which a surface of the transparent member on a side opposite to a surface on the substrate side is a non-lens surface formed in parallel with the one surface of the substrate.

[6] A substrate with a lens according to Item [4], in which a surface of the transparent member on a side opposite to a surface on the substrate side is arranged outside the through hole to be a convex lens surface.

[7] A substrate with a lens according to any one of Items [1] to [6], in which the lens member is a convex lens.

[8] A substrate with a lens according to any one of Items [1] to [7], in which the substrate is an electrical wiring board with electrical wiring.

[9] A substrate with a lens according to any one of Items [1] to [8], further including a resist having a height which is equal to or larger than a height from the one surface of the substrate to a top of the lens member, the resist being provided side by side with the lens member on the one surface of the substrate.

[10] A method of producing a substrate with a lens as described in any one of Items [1] to [9], the method including: a first step of forming a columnar member on one surface of a substrate; a second step of laminating, on the one surface side of the substrate, a photosensitive resin composition for forming a lens member to arrange the photosensitive resin composition for forming a lens member at least on the columnar member, and curing by exposure the photosensitive resin composition for forming a lens member on the columnar member to form a columnar member for forming a lens member on the columnar member; and a third step of heating the columnar member for forming a lens member to cause dripping thereof, thereby forming an upper surface thereof into a convex lens surface.

[11] A method of producing a substrate with a lens according to Item [10], in which the substrate is a substrate including a through hole, in which the first step includes: laminating a photosensitive resin composition for forming a columnar member from the one surface side of the substrate, and at the same time, filling the through hole, and laminating a resin composition for forming a transparent member from another surface side of the substrate, and at the same time, filling the through hole; exposing and curing a portion of the photosensitive resin composition for forming a columnar member, which matches with the through hole, and photocuring or thermosetting the resin composition for forming a transparent member; and developing and removing an uncured portion of the photosensitive resin composition for forming a columnar member to form the columnar member protruding from an inside of the through hole toward an outside of the one surface of the substrate.

[12] A method of producing a substrate with a lens according to Item [11], in which the first step includes arranging a mask having an opening portion at a location opposed to the through hole on another surface side of the substrate, and radiating an active light beam from the another surface side via the mask to expose and cure the photosensitive resin composition for forming a columnar member.

[13] A method of producing a substrate with a lens according to Item [11], in which the substrate exhibits light shielding performance against an active light beam in exposing the photosensitive resin composition for forming a columnar member, and in which the first step includes radiating the active light beam from the another surface side of the substrate to expose and cure a portion of the photosensitive resin composition for forming a columnar member, which matches with the through hole.

[14] A method of producing a substrate with a lens according to any one of Items [11] to [13], in which the second step includes arranging a mask having an opening portion at a location opposed to the through hole on the another surface side of the substrate, and radiating an active light beam from the another surface side via the mask to expose and cure the photosensitive resin composition for forming a lens member.

[15] A method of producing a substrate with a lens according to any one of Items [11] to [13], in which the substrate exhibits light shielding performance against an active light beam in exposing the photosensitive resin composition for forming a lens member, and in which the second step includes radiating the active light beam from the another surface side of the substrate to expose and cure a portion of the photosensitive resin composition for forming a lens member, which matches with the through hole.

[16] A method of producing a substrate with a lens according to any one of Items [11] to [15], in which the resin composition for forming a transparent member is a photosensitive resin composition.

[17] An optical waveguide with a lens, including: the substrate with a lens according to any one of Items [1] to [8]; an optical waveguide including a lower clad layer provided on the another surface side of the substrate, a core layer provided on the lower clad layer, and an upper clad layer provided on the core layer; and a mirror formed in the optical waveguide at a location opposed to the lens member.

[18] An optical waveguide with a lens, including the substrate with a lens according to Item [4], in which the transparent member serves as a lower clad layer laminated on the another surface of the substrate, in which a core layer and an upper clad layer are laminated on the lower clad layer to form an optical waveguide, and in which a mirror is formed in the optical waveguide at a location opposed to the lens member.

[19] An optical module, including the substrate with a lens according to any one of Items [1] to [9].

[20] A method of producing a substrate with a lens as described in any one of Items [1] to [8], the method including: a step (A) of laminating a substrate, a resin layer for forming a columnar member, and a resin layer for forming a curved surface shape in this order to form a laminate; a step (B) of etching the resin layer for forming a columnar member and the resin layer for forming a curved surface shape to forma laminated convex portion of a columnar member and a member for forming a curved surface shape; and a step (C) of heating the member for forming a curved surface shape to cause dripping thereof, thereby forming a lens member.

[21] A method of producing a substrate with a lens according to Item [20], in which the resin layer for forming a curved surface shape is a photosensitive resin layer.

[22] A method of producing a substrate with a lens according to Item [20] or [21], in which the resin layer for forming a columnar member is a photosensitive resin layer.

[23] A method of producing a substrate with a lens according to anyone of Items [20] to [22], in which the step (B) includes exposing and photocuring the resin layer for forming a curved surface shape, and then etching the resin layer for forming a curved surface shape to form a pattern.

[24] A method of producing a substrate with a lens according to anyone of Items [20] to [23], in which the step (B) includes exposing the resin layer for forming a columnar member simultaneously with exposure of the resin layer for forming a curved surface shape.

[25] A method of producing a substrate with a lens according to any one of Items [20] to [24], in which at least one of the resin layer for forming a curved surface shape and the resin layer for forming a columnar member is a resin layer formed of a dry film.

[26] A method of producing a substrate with a lens according to any one of Items [20] to [25], in which the substrate is a transparent substrate.

[27] A method of producing a substrate with a lens according to anyone of Items [20] to [26], in which the step (A) includes laminating, on the substrate, a resin film for forming a curved surface shape pattern including a laminate, which is produced in advance, of the resin layer for forming a curved surface shape and the resin layer for forming a columnar member.

[28] A method of producing a substrate with a lens according to Item [27], in which the resin film for forming a curved surface shape pattern includes at least one of a support film laminated on the side of the resin layer for forming a curved surface shape and a protective film laminated on the side of the resin layer for forming a columnar member.

[29] A substrate with a lens, which is obtained by the production method according to any one of Items [20] to [28].

[30] A method of producing a curved surface shape pattern, the method including: a step (A') of laminating a resin layer for forming a columnar member and a resin layer for forming a curved surface shape in this order to form a laminate; a step (B) of etching the resin layer for forming a columnar member and the resin layer for forming a curved surface shape to forma laminated convex portion of a columnar member and a member for forming a curved surface shape; and a step (C') of heating the member for forming a curved surface shape to cause dripping thereof, thereby forming a curved surface.

[31] A resin film for forming a curved surface shape pattern, including a laminate of a resin layer for forming a curved surface shape and a resin layer for forming a columnar member.

[32] A resin film for forming a curved surface shape pattern according to Item [31], further including at least one of a support film laminated on the side of the resin layer for forming a curved surface shape and a protective film laminated on the side of the resin layer for forming a columnar member.

[33] A substrate with a curved surface shape pattern, including: a substrate; a columnar member provided on one surface side of the substrate; and a curved surface shape pattern provided on the columnar member.

Effects of the Invention

According to the present invention, it is possible to provide the substrate with a lens that can, while arbitrarily selecting the height of the lens, form the lens in a uniform and desired shape. Further, according to one embodiment of the present invention, a curved surface shape pattern of a desired satisfactory shape is obtained.

Figure 1:
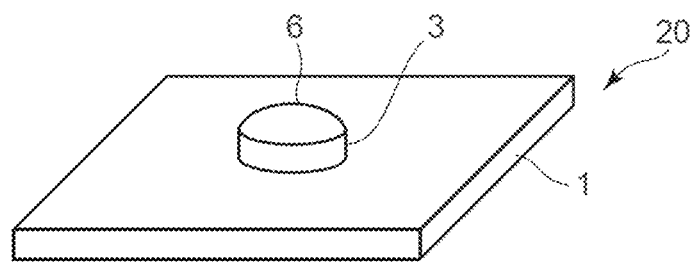
FIG. 1 is a perspective view of a substrate with a lens according to a first embodiment of the present invention.

REFERENCE SIGNS LIST 1 substrate
2 through hole
3 columnar member
3A resin layer for forming columnar member
5 transparent member
5A resin layer for forming transparent member
6 lens member
6A columnar member for forming lens member
7 lower clad layer
8 core layer
9 upper clad layer
10 optical waveguide
11 mirror
12 support film 13 resist
14 member for forming curved surface shape
14A resin layer for forming curved surface shape
15 convex lens surface
16 curved surface shape pattern
17 groove
17A slanted surface
18 light emitting element
19 light receiving element
20 substrate with lens
22 opening portion
23 photomask Description of Embodiments

[First Embodiment]
<Substrate with Lens>

A substrate 20 with a lens according to a first embodiment of the present invention includes a substrate 1, a columnar member 3 provided on one surface side of the substrate 1 so as to protrude from the one surface of the substrate 1, and a lens member 6 arranged on the columnar member 3. The lens member 6 is a convex lens, and an upper surface thereof is curved so as to be convex to form a convex lens surface (see FIG. 1).

In the substrate 20 with a lens, for example, an optical member such as a light emitting element, a light receiving element, an optical waveguide, or an optical fiber is arranged at a location opposed to the lens member 6 and at a location opposed to the other surface of the substrate 1 for optical communication.

Figure 2:
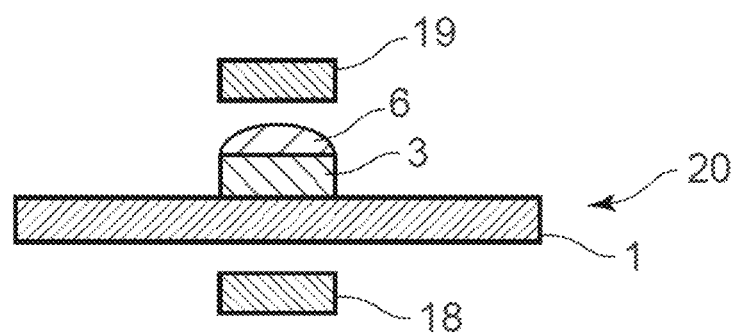
FIG. 2 is a sectional view of the substrate with a lens according to the first embodiment.

Specifically, for example, as illustrated in FIG. 2, a light emitting element 18 is arranged at a location which is opposed to the other surface of the substrate 1 and which matches with the lens member 6, and a light receiving element 19 is arranged at a location which is opposed to the lens member 6. An optical signal emitted from the light emitting element 18 enters the substrate 1 from the other surface side of the substrate 1, and the incident optical signal passes through the substrate 1, the columnar member 3, and the lens member 6, and is concentrated by the convex lens surface of the lens member 6 to enter the light receiving element 19. Such a structure enables optical communication with small optical loss.

Next, the respective members of the substrate with a lens are described.
(Substrate)

A material for the substrate 1 is not particularly limited, and examples thereof include a glass epoxy resin substrate, a ceramic substrate, a glass substrate, a silicon substrate, aplastic substrate, a metal substrate, a substrate provided with a resin layer, a substrate provided with a metal layer, a plastic film, a plastic film provided with a resin layer, a plastic film provided with a metal layer, a resin film, and an electric wiring board. Suitable examples of the resin film include: polyester such as polyethylene terephthalate, polybutyleneterephthalate, or polyethylenenaphthalate; polyolefin such as polyethylene or polypropylene; and polyamide, polycarbonate, polyphenylene ether, polyether sulfide, polyarylate, a liquid crystal polymer, polysulfone, polyether sulfone, polyether ether ketone, polyether imide, polyamide imide, and polyimide. Among them, a material that shields an active light beam for photocuring a resin for forming a columnar member or resin for forming a lens member to be described later is particularly preferred.

For example, when the active light beam for photocuring the resin for forming a columnar member is UV light, suitable examples of such material include a metal substrate, a plastic substrate such as a polyimide film that does not transmit the UV light, and a glass epoxy resin substrate.

Although the thickness of the substrate is not particularly limited, the thickness of the substrate is preferably from 5 µm to 1 mm, more preferably from 10 µm to 100 µm from the viewpoints of securing the strength of the substrate and reducing an optical loss due to the shortening of an optical path.

In the first embodiment, the substrate 1 that can transmit the optical signal to be used has only to be used, and for example, when the optical signal to be used is infrared light, a plastic substrate such as a polyimide film, a silicon substrate, or the like which transmits the infrared light is desirably used.
(Lens Member)

Although a material for the lens member 6 is not particularly limited as long as the material is transparent to the optical signal, the material is preferably a cured product of a photosensitive resin composition or/and a thermosetting resin composition from the viewpoint of a production method to be described later.

A resin composition that liquefies (drips) and then cures to turn into a lens shape or a liquid resin composition is more preferably used as the material for the lens member 6 because the lens member can be formed on the columnar member 3 without the eccentricity of its lens center position. In particular, when the viscosity of the material in a liquid state is low, the lens center is automatically aligned with the center of the columnar member 3 on the columnar member 3. From the foregoing view points, the lens member is preferably of a convex lens shape such as a spherical surface or an aspherical surface.

In addition, the height (thickness) of the lens member 6 is preferably 5 µm or more because a curvature as a lens is easily obtained, and the height (thickness) is preferably 150 µm or less because it becomes easy to control the thickness. In addition, when the lens member 6 is formed by photolithography processing as described later, the thickness of a member 14 for forming a curved surface shape to be described later (a thickness on the columnar member 3) has only to be appropriately selected depending on the lens shape after the dripping.

The photosensitive resin composition to be used in the formation of the lens member 6 preferably contains (a) a binder polymer, (b) a photopolymerizable unsaturated compound having an ethylenically unsaturated group, and (c) a photopolymerization initiator. The photosensitive resin composition cures by being irradiated with an active light beam, and a cured product thereof drips by being heated to turn into a lens shape.

An example of (a) the binder polymer is a vinyl copolymer, and a specific example thereof is a copolymer obtained by polymerizing, for example, the following vinyl monomer: acrylic acid, methacrylic acid, maleic acid, fumaric acid, itaconic acid, methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, iso-butyl acrylate, iso-butyl methacrylate, sec-butyl acrylate, sec-butyl methacrylate, tert-butyl acrylate, tert-butyl methacrylate, pentyl acrylate, pentyl methacrylate, hexyl acrylate, hexyl methacrylate, heptyl acrylate, heptyl methacrylate, 2-ethylhexyl acrylate, 2-ethylhexylmethacrylate, octylacrylate, octylmethacrylate, nonyl acrylate, nonyl methacrylate, decyl acrylate, decyl methacrylate, dodecyl acrylate, dodecyl methacrylate, tetradecyl acrylate, tetradecyl methacrylate, hexadecyl acrylate, hexadecyl methacrylate, octadecyl acrylate, octadecyl methacrylate, eicosyl acrylate, eicosyl methacrylate, docosyl acrylate, docosyl methacrylate, cyclopentyl acrylate, cyclopentyl methacrylate, cyclohexylacrylate, cyclohexyl methacrylate, cycloheptyl acrylate, cycloheptyl methacrylate, benzylacrylate, benzylmethacrylate, phenylacrylate, phenyl methacrylate, methoxyethyl acrylate, methoxyethyl methacrylate, methoxy diethylene glycol acrylate, methoxy diethylene glycol methacrylate, methoxy dipropylene glycol acrylate, methoxy dipropylene glycol methacrylate, methoxytriethylene glycol acrylate, methoxytriethylene glycol methacrylate, 2-hydroxyethyl acrylate, 2-hydroxyethylmethacrylate, dimethylaminoethylacrylate, dimethylaminoethyl methacrylate, diethylaminoethyl acrylate, diethylaminoethyl methacrylate, dimethylaminopropyl acrylate, dimethylaminopropyl methacrylate, 2-chloroethyl acrylate, 2-chloroethyl methacrylate, 2-fluoroethyl acrylate, 2-fluoroethyl methacrylate, 2-cyanoethyl acrylate, 2-cyanoethyl methacrylate, styrene, α-methylstyrene, cyclohexyl maleimide, dicyclopentanyl acrylate, dicyclopentanyl methacrylate, vinyltoluene, vinyl chloride, vinyl acetate, N-vinylpyrrolidone, butadiene, isoprene, chloroprene, acrylamide, methacrylamide, acrylonitrile, or methacrylonitrile. One kind of those monomers may be polymerized alone, or two or more kinds thereof may be polymerized in combination.

Further, for example, a radically polymerizable copolymer having an ethylenically unsaturated group on a side chain thereof obtained as follows may be used as (a) the binder polymer: a vinyl copolymer having a functional group such as a carboxyl group, a hydroxyl group, an amino group, an isocyanate group, an oxirane ring, or an acid anhydride, and a compound having one functional group such as an oxirane ring, an isocyanate group, a hydroxyl group, or a carboxyl group that reacts with the functional group of the vinyl copolymer to bond to the group and at least one ethylenically unsaturated group are subjected to an addition reaction.

As a vinyl monomer to be used for producing the vinyl copolymer having a functional group such as a carboxyl group, a hydroxyl group, an amino group, an isocyanate group, an oxirane ring, or an acid anhydride, there are given, for example, acrylic acid, methacrylic acid, maleic acid, fumaric acid, itaconic acid, cinnamic acid, 2-hydroxyethyl acrylate, 2-hydroxyethyl methacrylate, acrylamide, methacrylamide, isocyanatoethyl acrylate, isocyanatoethyl methacrylate, glycidyl acrylate, glycidyl methacrylate, and maleic anhydride. One kind of those monomers may be polymerized alone, or two or more kinds thereof may be polymerized in combination. In addition, the vinyl monomer except a vinyl monomer having a functional group such as a carboxyl group, a hydroxyl group, an amino group, an isocyanate group, an oxirane ring, or an acid anhydride may be copolymerized as required.

In addition, the weight-average molecular weight (value measured by gel permeation chromatography and converted in terms of standard polystyrene) of (a) the binder polymer is set to preferably from 1,000 to 300,000, more preferably from 5,000 to 150,000 from the viewpoints of, for example, the heat resistance, heating meltability, and applicability of the composition, film property (a characteristic by which a film shape is maintained) when the composition is used as a photosensitive element for a microlens array to be described later, the solubility of the composition in a solvent, and the solubility of the composition in a developer in a developing step.

Further, the acid value of (a) the binder polymer is preferably specified so that the composition can be developed with various known developers. For example, when the development is performed with an alkaline aqueous solution containing sodium carbonate, potassium carbonate, tetramethylammonium hydroxide, triethanolamine, or the like, the acid value is preferably set to from 50 to 260 mgKOH/g. When the acid value is 50 mgKOH/g or more, the development becomes easy, and when the acid value is 260 mgKOH/g or less, developer resistance (property by virtue of which a portion serving as a pattern without being removed by the development is not eroded by the developer) becomes sufficient. In addition, when the development is performed with water, or an alkaline aqueous solution formed of an alkaline aqueous solution and one or more kinds of surfactants, the acid value is preferably set to from 16 to 260 mgKOH/g. When the acid value is 16 mgKOH/g or more, the development becomes easier, and when the acid value is 260 mgKOH/g or less, the developer resistance becomes more sufficient.

Examples of (b) the photopolymerizable unsaturated compound having an ethylenically unsaturated group include a compound obtained by subjecting a polyhydric alcohol and an α,β-unsaturated carboxylic acid to a reaction, 2,2-bis(4-(di(meth)acryloxypolyethoxy)phenyl)propane, a compound obtained by subjecting a glycidyl group-containing compound and an α,β-unsaturated carboxylic acid to a reaction, a urethane monomer, nonylphenyldioxylene (meth)acrylate, γ-chloro-β-hydroxypropyl-β'-(meth)acryloyloxyethyl-o-phthalate, p-hydroxyethyl-p'-(meth)acryloyloxyethyl-o-phthalate, p-hydroxypropyl-p'-(meth)acryloyloxyethyl-o-phthalate, and a (meth)acrylic acid alkyl ester. As used herein, the term "(meth)acryloxy" means "acryloxy and/or methacryloxy", the term "(meth)acrylate" means "acrylate and/or methacrylate", and terms similar thereto each have a similar meaning.

Examples of the compound obtained by subjecting a polyhydric alcohol and an α,β-unsaturated carboxylic acid to a reaction include polyethylene glycol di(meth)acrylate having 2 to 14 ethylene groups, polypropylene glycol di(meth)acrylate having 2 to 14 propylene groups, trimethylolpropane di(meth)acrylate, trimethylolpropane tri(meth)acrylate, trimethylolpropane ethoxy tri(meth)acrylate, trimethylolpropane diethoxytri(meth)acrylate, trimethylolpropane triethoxy tri(meth)acrylate, trimethylolpropane tetraethoxy tri(meth)acrylate, trimethylolpropane pentaethoxy tri(meth)acrylate, tetramethylolmethane tri(meth)acrylate (pentaerythritol tri(meth)acrylate), tetramethylolmethane tetra(meth)acrylate, dipentaerythritol penta(meth)acrylate, and dipentaerythritol hexa(meth)acrylate.

Examples of the 2,2-bis(4-(di(meth)acryloxypolyethoxy) phenyl)propane include 2,2-bis(4-(di(meth)acryloxydiethoxy)phenyl)propane, 2,2-bis(4-(di(meth)acryloxytriethoxy)phenyl)propane, 2,2-bis(4-(di(meth) acryloxypentaethoxy)phenyl)propane, and 2,2-bis(4-(di (meth)acryloxydecaethoxy)phenyl)propane.

Examples of the compound obtained by subjecting a glycidyl group-containing compound and an α,β-unsaturated carboxylic acid to a reaction include trimethylolpropane triglycidyl ether tri(meth)acrylate and 2,2-bis(4-(meth) acryloxy-2-hydroxy-propyloxy)phenyl.

Examples of the urethane monomer include: a product of an addition reaction of a (meth)acrylic monomer having an OH group at its β position, and an isocyanate compound such as isophorone diisocyanate, 2,6-toluene diisocyanate, 2,4-toluene diisocyanate, or 1,6-hexamethylene diisocyanate; tris((meth)acryloxy tetraethylene glycol isocyanato)

hexamethylene isocyanurate; ethylene oxide-modified urethane di(meth)acrylate; and propylene oxide-modified urethane di(meth)acrylate.

Examples of the (meth)acrylic acid alkyl ester include (meth)acrylic acid methyl ester, (meth)acrylic acid ethyl ester, (meth)acrylic acid butyl ester, and (meth)acrylic acid 2-ethylhexyl ester.

One kind of the photopolymerizable unsaturated compounds may be used alone, or two or more kinds thereof may be used in combination.

(c) The photopolymerization initiator produces a free radical by an active light beam. Examples thereof include: an aromatic ketone such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, 2-benzyl-2-dimethylamino-1-(4-morpholinophenyl)-butan-1-one ("IRGACURE 369", BASF Japan Ltd., trade name), or 2-methyl-1-[4-(methylthio)phenyl]-2-morpholino-propan-1-one ("IRGACURE 907", BASF Japan Ltd., trade name); a quinone such as 2-ethylanthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, or 2,3-dimethylanthraquinone; a benzoin ether compound such as benzoin methylether, benzoin ethylether, or benzoin phenylether; a benzoin compound such as benzoin, methylbenzoin, or ethyl benzoin; a benzyl derivative such as benzyl dimethyl ketal; a 2,4,5-triarylimidazole dimer such as 2-(o-chlorophenyl)-4,5-diphenylimidazole dimer, 2-(o-chlorophenyl)-4,5-di (methoxyphenyl)imidazole dimer, 2-(o-fluorophenyl)-4,5-diphenylimidazole dimer, 2-(o-methoxyphenyl)-4,5-diphenylimidazole dimer, or 2-(p-methoxyphenyl)-4,5-diphenylimidazole dimer; an acridine derivative such as 9-phenylacridine or 1,7-bis(9,9'-acridinyl)heptane; and N-phenylglycine, an N-phenylglycine derivative, and a coumarin-based compound.

In addition, substituents with which two 2,4,5-triarylimidazoles are substituted in the 2,4,5-triarylimidazole dimer may be identical to or different from each other. In addition, a thioxanthone-based compound and a tertiary amine compound may be combined like a combination of diethylthioxanthone and dimethylaminobenzoic acid.

In this embodiment, the 2,4,5-triarylimidazole dimer is preferred from the viewpoints of adhesiveness with the columnar member 3 and sensitivity. Further, 2-methyl-1-[4-(methylthio)phenyl]-2-morpholino-propan-1-one is more preferred from the viewpoint of a visible light transmittance.

One kind of the photopolymerization initiators may be used alone, or two or more kinds thereof may be used in combination.

The compounding ratio of (a) the binder polymer in this embodiment is set to preferably from 20 to 90 parts by mass, more preferably from 30 to 85 parts by mass, particularly preferably from 35 to 80 parts by mass, extremely preferably from 40 to 75 parts by mass with respect to 100 parts by mass of the total amount of the components (a) and (b). When the compounding ratio is 20 parts by mass or more, the applicability, the heating meltability, and the film property improve, and when the compounding ratio is 90 parts by mass or less, the photocurability and heat resistance of the composition become sufficient.

In addition, the compounding ratio of (b) the photopolymerizable unsaturated compound having an ethylenically unsaturated group is set to preferably from 10 to 80 parts by mass, more preferably from 15 to 70 parts by mass, particularly preferably from 20 to 65 parts by mass, extremely preferably from 25 to 60 parts by mass with respect to 100 parts by mass of the total amount of the components (a) and (b). When the compounding ratio is 10 parts by mass or more, the photocurability and the heat resistance improve, and when the compounding ratio is 80 parts by mass or less, the applicability, the heating meltability, and the film property become sufficient.

In addition, the compounding ratio of (c) the photopolymerization initiator is set to preferably from 0.05 to 20 parts by mass, more preferably from 0.1 to 15 parts by mass, particularly preferably from 0.15 to 10 parts by mass with respect to 100 parts by mass of the total amount of the components (a) and (b). When the compounding ratio is 0.05 part by mass or more, the photocuring of a photosensitive layer containing the composition becomes sufficient, and when the compounding ratio is 20 parts by mass or less, the absorption of an active light beam on the surface of the photosensitive layer irradiated with the active light beam is suppressed at the time of exposure, and hence the photocuring of the inside thereof becomes sufficient.

The photosensitive resin composition in this embodiment may contain an adhesiveness-imparting agent such as a silane coupling agent, a leveling agent, a plasticizer, a filler, an antifoaming agent, a flame retardant, a stabilizer, an antioxidant, a flavor, a thermal crosslinking agent, a polymerization inhibitor, or the like as required. One kind of those materials may be used alone, or two or more kinds thereof may be used in combination. In addition, the compounding ratio of each of the materials may be set to from 0.01 to 20 parts by mass with respect to 100 parts by mass of the total amount of the components (a) and (b).

(Columnar Member)

The columnar member 3 is a member protruding from the surface of the substrate 1 and its top surface is desirably a flat surface. As is apparent from FIG. 1, the columnar member 3 is preferably formed into a cylindrical shape in accordance with the shape of the lens member 6. It is preferred that the columnar member 3 be formed as a body separate from the substrate 1 and be formed of a transparent material having transmittance for the wavelength of the optical signal so that the member can transmit the optical signal. The material for the columnar member 3, which is not particularly limited, is preferably a photosensitive resin composition from the viewpoint of the production method to be described later, and is more preferably a cured product of a negative photosensitive resin composition.

In addition, a material that neither drips nor deforms owing to heating in a third step to be described later is preferably used as the cured product of the photosensitive resin composition for forming the columnar member 3, and for example, a material whose melting starting temperature is higher than that of a cured product of the resin composition for forming a lens member or that does not melt owing to heating is desirable. Specifically, the same composition as that used for forming a clad or core to be described later may be used.

Note that, when an active light beam is applied from the other surface side of the substrate 1 to expose and cure the photosensitive resin composition for forming a lens member on the columnar member 3 through the columnar member 3 as described later, the columnar member 3 is desirably formed of a material that transmits the active light beam.

When the height of the columnar member 3 from the surface of the substrate 1 (one surface of the substrate 1) is arbitrarily selected, the height and position of the lens member 6 can be arbitrarily selected, and the shapes of the lens member 6 and the columnar member 3 can be selected. The height of the columnar member 3 from the surface of the substrate 1, which is appropriately selected depending on the height of the lens member to be formed on the columnar member 3, is desirably 5 µm or more because a distance between the lens member 6 and the surface of the substrate 1 can be secured, and the height is preferably 100 µm or less because the height of the columnar member 3 can be easily controlled. In addition, the height is more preferably 50 µm or less from the viewpoint of controlling the thickness of the photosensitive resin composition for forming a lens member for forming the lens member 6.

<Method of Producing Substrate with Lens>

The substrate 20 with a lens is produced by, for example, a production method including the following first to third steps:

first step: the step of forming a columnar member on one surface of the substrate;

second step: the step of laminating a photosensitive resin composition for forming a lens member on one surface side of the substrate so that the photosensitive resin composition for forming a lens member may be placed at least on the columnar member, followed by the curing of the photosensitive resin composition for forming a lens member on the columnar member through exposure to form a columnar transparent member for forming a lens member on the columnar member; and third step: the step of heating the columnar transparent member for forming a lens member to cause the member to drip to form its top surface into a convex lens surface.

Hereinafter, the substrate with a lens according to the first embodiment and the method of producing the substrate are described in more detail with reference to FIGS. 3 and 4.

(First Step)

Figure 3:
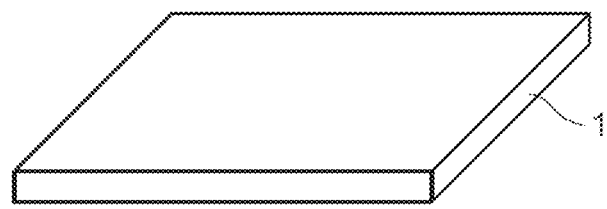
FIG. 3 are perspective views illustrating a method of producing the substrate with a lens according to the first embodiment.
Figure 3:
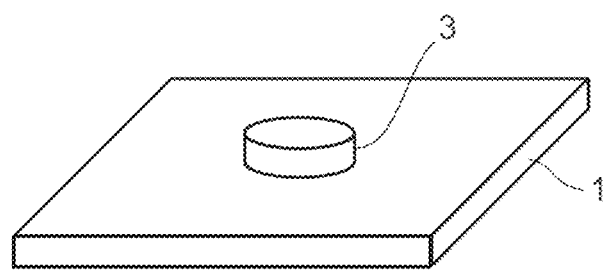
Figure 3:
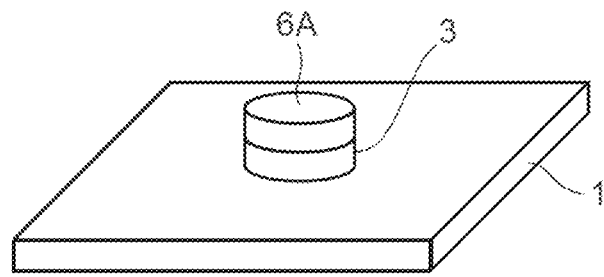
Figure 3:
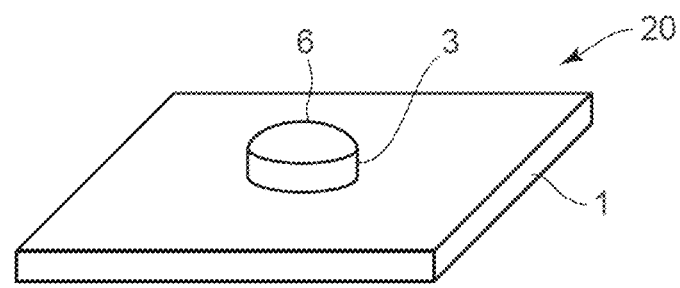
Figure 4:
FIG. 4 are sectional views illustrating the method of producing the substrate with a lens according to the first embodiment.
Figure 4:
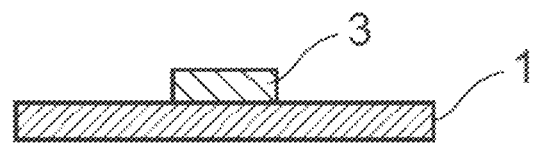
Figure 4:
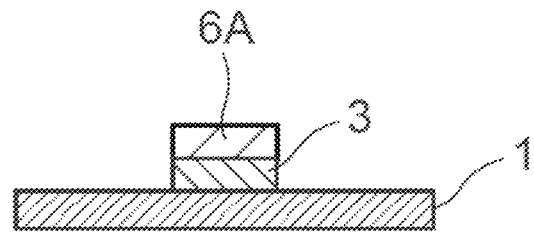
Figure 4:
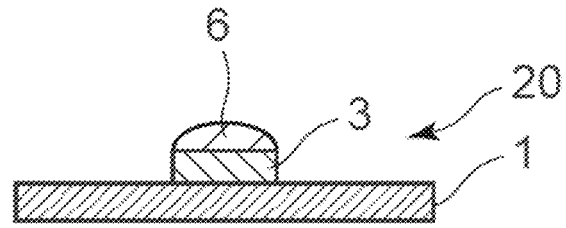

In the first step, the columnar member 3 is formed on one surface of the substrate 1 (see FIG. 3 (b) and FIG. 4 (b)). Although a method of forming the columnar member 3 is not particularly limited, examples of the method include: a method involving forming the columnar member 3 as a member separate from the substrate 1 and then bonding the member to the substrate with an adhesive or the like; and a method involving laminating a resin composition for forming a columnar member on the substrate 1 so that the composition may have a desired thickness, and patterning the composition through photolithography processing to turn the composition into the columnar member 3.

It is more preferred that the columnar member 3 be formed by the photolithography processing from the viewpoint of its alignment accuracy, and it is still more preferred that the resin composition for forming a columnar member be a photosensitive resin, and the member be formed by exposure and development.

Although a method of laminating the resin composition for forming a columnar member on the substrate 1 is not particularly limited, the composition can be laminated by: a method involving applying the composition onto the substrate 1 with a comma coater, a die coater, a spin coater, or the like; or a method involving applying a resin onto a carrier film and drying the resin in advance, and bonding the resultant as a dry film shape to the substrate with a roll laminator, a vacuum roll laminator, a vacuum laminator, a normal-pressure press, a vacuum press, or the like.

(Second Step)

After the completion of the first step, in the second step, the photosensitive resin composition for forming a lens member is laminated on one surface side of the substrate 1 so that the photosensitive resin composition for forming a lens member may be placed at least on the columnar member 3, and the photosensitive resin composition for forming a lens member on the columnar member is cured through exposure to form a columnar member 6A for forming a lens member, which is formed of a cured product of the photosensitive resin composition for forming a lens member, on the columnar member 3 (see FIG. 3(c) and FIG. 4(c)).

Here, the photosensitive resin composition for forming a lens member to be laminated on one surface side of the substrate 1, which is not particularly limited, may be laminated only on the columnar member 3, or may be laminated on each of both the columnar member Sand the substrate 1. However, the photosensitive resin composition for forming a lens member is preferably laminated on each of both the columnar member 3 and the substrate 1 by a method involving application or a method involving bonding as in the first step.

In addition, a method of exposing the photosensitive resin composition for forming a lens member is not particularly limited, and any method is permitted as long as the photosensitive resin on the columnar member 3 can be cured. Note that, when the photosensitive resin composition for forming a lens member is laminated on each of both the columnar member 3 and the substrate 1, it is necessary to expose only the photosensitive resin composition for forming a lens member laminated on the columnar member 3 because the exposure of the photosensitive resin composition for forming a lens member over a range from the top of the columnar member 3 to the top of the surface of the substrate 1 makes it impossible to obtain a desired lens shape in a subsequent step.

When the photosensitive resin composition for forming a lens member is laminated on each of both the columnar member 3 and the substrate 1, an uncured portion of the photosensitive resin composition for forming a lens member laminated on the substrate 1 is developed and removed, thereby forming the columnar member 6A for forming a lens member on the columnar member 3. A method of removing the uncured portion is not particularly limited, and the uncured portion has only to be removed with a solvent or an alkaline solution.

On the other hand, when the photosensitive resin composition for forming a lens member is laminated only on the columnar member 3, the step of developing and removing the uncured portion is unnecessary, and hence the columnar member 6A for forming a lens member can be formed merely by curing the photosensitive resin composition for forming a lens member.

In the production method, the thickness of the columnar member 6A for forming a lens member has only to be appropriately selected depending on the desired lens shape of the lens member 6.

In addition, for example, when the photosensitive resin composition for forming a lens member is processed into a film shape, and the film is laminated on each of the columnar member 3 and the substrate 1 by lamination, the thickness of the film is preferably set in consideration of the fact that the thickness of the film of the photosensitive resin composition for forming a lens member is nearly equal to the sum of the thickness of the columnar member 6A for forming a lens member and the thickness of the columnar member 3.

The thickness (height) of the columnar member 6A for forming a lens member is substantially equal to the height of the lens member 6, and is preferably 5 µm or more and 150 µm or less.

In the production method, the photosensitive resin composition for forming a columnar member and the photosensitive resin composition for forming a lens member may each be cured by being subjected to pattern exposure with a photomask. Specifically, in each of the first and second steps, a photomask having an opening portion (the shape of the opening portion is the same as the shape of the columnar member) is placed on a resin layer for forming a columnar member formed by using the photosensitive resin composition for forming a columnar member on the substrate 1 or on a resin layer for forming a lens member formed by using the photosensitive resin composition for forming a lens member thereon, and the resultant is irradiated with an active light beam from a photomask side. Thus, the columnar member 3 or the lens member 6 can be formed at a predetermined site.

In addition, when the substrate 1 transmits the active light beam, the columnar member 3 or the lens member 6 can be formed at the predetermined site by, for example, placing the photomask on a surface opposite to the surface having formed thereon the resin layer for forming a columnar member or the resin layer for forming a lens member (that is, the other surface side), and irradiating the resultant with the active light beam from the photomask side.

In addition, the columnar member 3 or the lens member 6 can be formed at the predetermined site by producing a resin film including a laminate of the resin layer for forming a columnar member and the resin layer for forming a lens member in the first step and the second step in advance, laminating the film on the substrate, and subjecting the resultant to photolithography processing.

The resin film to be used here is preferably such that a support film is laminated on a side closer to the photosensitive resin layer for forming a lens member, and is preferably such that a protective film is laminated on a side closer to the resin layer for forming a columnar member. The presence of the support film facilitates the production of a resin film for forming a curved surface shape pattern, and the presence of the protective film protects the resin layer for forming a columnar member. One of the support film and the protective film may be provided, or both of the films may be provided. The resin film for forming a curved surface shape pattern facilitates the control of the thicknesses of the resin layer for forming a columnar member and the photosensitive resin layer for forming a lens member (see the section "Resin film for forming curved surface shape pattern" to be described later for details).

(Third Step)

In the third step, the columnar member 6A for forming a lens member is heated to be caused to drip, thereby forming the top surface of the columnar member 6A for forming a lens member into a convex lens surface. Thus, the lens member 6 is formed on the columnar member 3 and hence the substrate 20 with a lens is obtained (see FIG. 3(*d*) and FIG. 4(*d*)). Note that, the columnar member 3 does not melt owing to the heating in the third step and continues to maintain its shape before the heating.

As described above, according to this embodiment, the lens member 6 is formed on the columnar member 3, and hence the lens surface of the lens member 6 can be placed at an arbitrary height from the surface of the substrate 1 by appropriately regulating the height of the columnar member 3. Accordingly, an optical loss can be reduced by shortening a distance between the lens member and any other optical member (e.g., the light-receiving element 19).

In addition, in this embodiment, the curvature or the like of the convex lens surface can also be arbitrarily set by appropriately adjusting the height of the lens member 6, which facilitates the molding of the lens member 6 having a desired shape. Further, according to the production method, dripping on the columnar member 3 is limited, and hence the resin for forming a lens member that has liquefied can form the lens member 6 without falling down from the columnar member 3. Further, misregistration between the center position of the lens member 6 and the center position of the columnar member 3 hardly occurs.

In addition, the lens member 6 can be formed without bringing the resin composition for forming a lens member into contact with the substrate 1. Accordingly, the lens member 6 can be formed without any change in lens shape due to unevenness on the surface of the substrate or a difference in wettability of the resin composition for forming a lens member for the substrate 1, and hence a lens member having a constant shape and a constant thickness can be formed with high accuracy irrespective of the kind of the substrate 1.

Although the columnar member has been provided as a member separate from the substrate 1 in the first embodiment, the columnar member may be formed as a member integral with the substrate 1. In this case, the columnar member is obtained by, for example, a method involving deforming part of the substrate 1 through stamping processing or the like to form the member.

[Second Embodiment]

A substrate with a lens according to a second embodiment of the present invention uses, as a substrate, a substrate 1 having a through hole 2 formed therein, and includes the columnar member 3 and the lens member 6 over the through hole 2. Further, a transparent member 5 is provided on the other surface side of the substrate 1. Differences of the second embodiment from the first embodiment are described in the following with reference to FIGS. 5 and 6.

Figure 5:
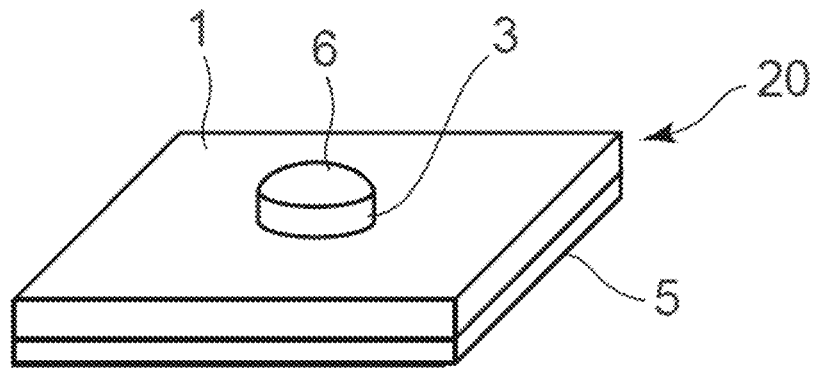
FIG. 5 is a perspective view of a substrate with a lens according to a second embodiment of the present invention.
Figure 6:
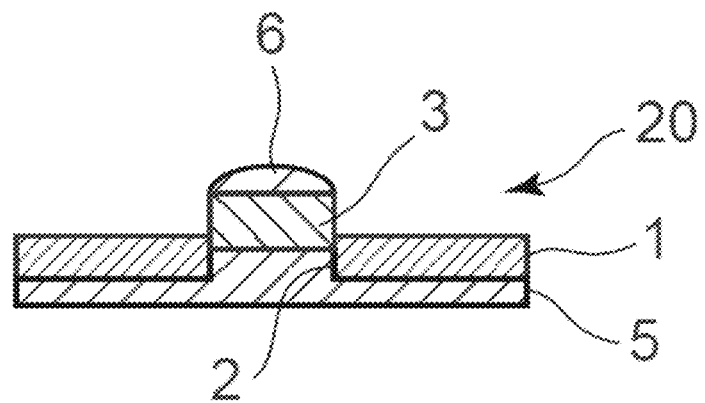
FIG. 6 is a sectional view of the substrate with a lens according to the second embodiment.

As illustrated in FIGS. 5 and 6, the columnar member 3 according to this embodiment is formed so that part thereof fills the one surface side of the through hole 2 and part thereof protrudes from the through hole 2. The transparent member 5 is a member laminated on the other surface of the substrate 1, and, at a portion where the through hole 2 exists, enters the through hole 2 to fill the other surface side of the through hole 2. In this way, the inside of the through hole 2 is filled with the transparent member 5 and the columnar member 3 without a void. However, the inside of the through hole 2 may be filled with only any one of the columnar member 3 and the transparent member 5.

As the substrate 1 of this embodiment, a substrate similar to that in the first embodiment can be used, but, because an optical signal passes through the through hole 2, a material other than one having transmittance for the optical signal can be used. Further, taking a production method into consideration, similarly to the case of the first embodiment, a substrate which can block an active light beam such as UV light is preferred.

(Through Hole)

The through hole 2 can be suitably formed in the substrate 1 by, for example, drill processing or laser processing. Further, the through hole 2 may be the through hole 2 with a metal layer formed of a metal of various kinds on a side surface of the through hole 2 by vapor deposition, sputtering, plating, or the like. Further, when metal foil is provided on an outer periphery of the through hole 2 on the one surface or the other surface of the substrate 1, the metal foil can be used as a light shielding portion.

A shape seen in plan view orthogonal to a depth direction of the through hole 2 is not particularly limited, and may be circular such as a perfect circle or an ellipse, polygonal such as a triangle, a quadrangle, a pentagon, or a hexagon, or the like. However, it is preferred that the through hole 2 have a shape which matches with a shape seen in plan view of the lens member 6, and be formed so as to be circular such as a perfect circle. Further, space in the through hole 2 may have the same shape irrespective of a location therein in the depth direction, or may be tapered upward or downward along the depth direction.

The through hole 2 may have any amount of area seen in plan view insofar as the optical loss is not affected, and the area is preferably 600 to 800,000 µm², more preferably 2,500 to 200,000 µm².

(Transparent Member)

It is sufficient that the material for the transparent member 5 has transmittance for the wavelength of the optical signal. The material is preferably a cured product of a photosensitive resin composition or a cured product of a thermosetting resin composition from the viewpoint of a production method to be described later, and is more preferably a cured product of a photosensitive resin composition from the viewpoint of being able to be formed together with the columnar member 3.

Further, as described later, when a photosensitive resin composition for forming a columnar member and a photosensitive resin composition for forming a lens member are exposed via the transparent member 5 to be cured, the material is preferably a material that transmits an active light beam that can cure these resin compositions such as UV light.

It is enough that the transparent member 5 and the columnar member 3 are connected to each other in the through hole 2. "Connected" as used herein means a state in which no void exists in the through hole and the inside of the through hole is filled with the transparent member 5 and/or the columnar member 3.

A thickness of the transparent member 5 is not particularly limited, but, when the thickness is 1 µm or more, adhesion to the substrate 1 is easy to secure, and, when the thickness is 100 µm or less, control of the thickness is easy, which are thus preferred. When the thickness is 50 µm or less, a thickness of the entire substrate with a lens can be reduced, which is more preferred. Note that, the thickness of the transparent member 5 means a thickness of a portion of the transparent member 5 which is not opposed to the through hole 2.

Further, a bottom surface of the transparent member 5 (that is, a surface of the transparent member which is opposite to the surface on the substrate side) is formed as a flat surface in parallel with the surface of the substrate 1, and is a non-lens surface. Therefore, when light enters the bottom surface of the transparent member 5, scattering of light at the bottom surface is inhibited.

Figure 7:
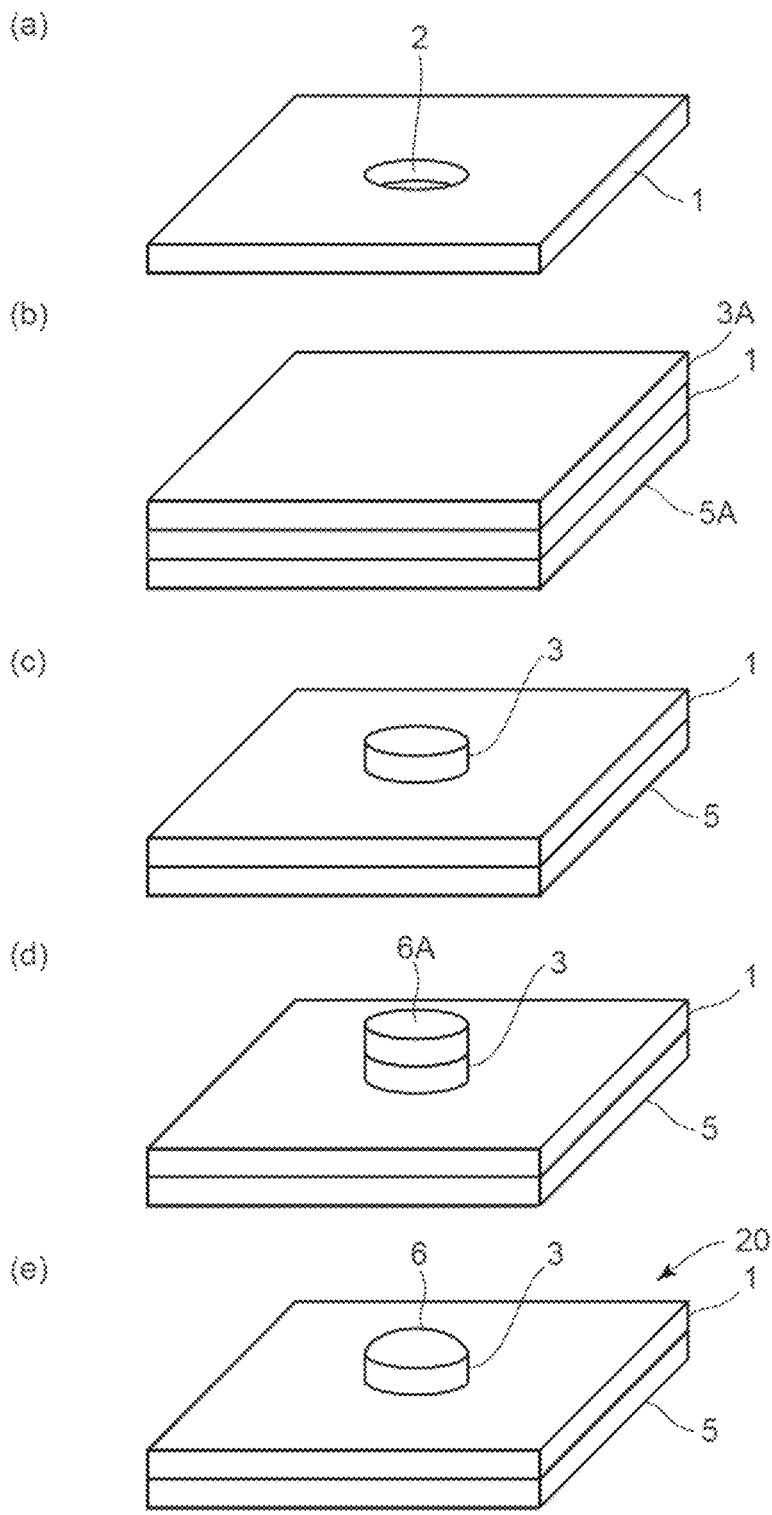
FIG. 7 are perspective views illustrating a method of producing the substrate with a lens according to the second embodiment.
Figure 8:
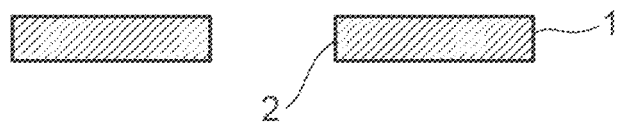
FIG. 8 are sectional views illustrating the method of producing the substrate with a lens according to the second embodiment.
Figure 8:
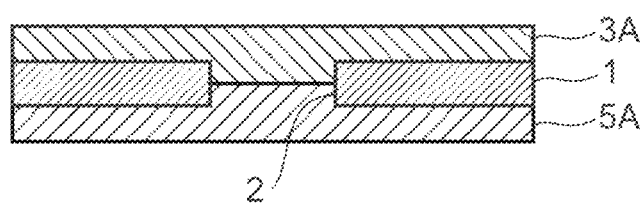
Figure 8:
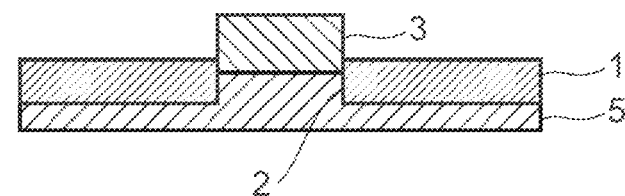
Figure 8:
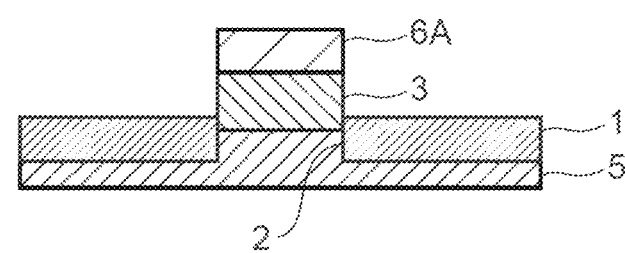
Figure 8:
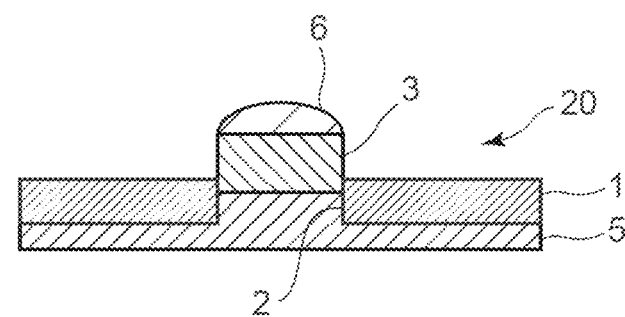

Next, the substrate with a lens according to the second embodiment and the method of producing the substrate are described with reference to FIGS. 7 and 8. In the second embodiment, the substrate with a lens is produced in accordance with the following first to third steps. In the following, the production method of this embodiment is described. Note that, in the following, description is made of an example of a case where, as the substrate, a polyimide film or the like is used, which blocks an active light beam for exposing a photosensitive resin composition for forming a columnar member and a photosensitive resin composition for forming a lens member, but the present invention is not limited thereto.

(First Step)

In this embodiment, in the first step, in addition to the columnar member 3, the transparent member 5 is formed. This step is described in detail in the following.

First, as the substrate, the substrate 1 having the through hole 2 formed therein is prepared (see FIG. 7(a) and FIG. 8(a)). Then, a resin layer 3A for forming a columnar member is laminated on the one surface of the substrate 1 by using the photosensitive resin composition for forming a columnar member, so that the photosensitive resin composition for forming a columnar member fills the inside of the through hole 2 from the one surface side of the substrate 1. Further, a resin layer 5A for forming a transparent member is laminated on the other surface of the substrate 1 by using the resin composition for forming a transparent member, so that the resin composition for forming a transparent member fills the inside of the through hole 2 from the other surface side of the substrate 1 (see FIG. 7(b) and FIG. 8(b)). At this time, any one of a step of laminating the resin layer 3A for forming a columnar member and a step of laminating the resin layer 5A for forming a transparent member may be the first or the two steps may be carried out simultaneously, but, if the steps are carried out simultaneously, the number of steps is reduced, which is more preferred.

Here, a method of laminating the photosensitive resin composition for forming a columnar member and the resin composition for forming a transparent member is not particularly limited, and, similarly to the case of the first step described above, an applying method or a bonding method may be used. Using these methods, the photosensitive resin composition for forming a columnar member and the resin composition for forming a transparent member fill the inside of the through hole 2, and are laminated on the one surface or the other surface of the substrate as the resin layer 3A for forming a columnar member and the resin layer 5A for forming a transparent member.

Then, by irradiating the substrate 1 with an active light beam from the other surface side, the photosensitive resin composition for forming a columnar member and the resin composition for forming a transparent member are exposed to be photocured. In this case, as the substrate 1, one which blocks the active light beam is used, and thus, the one surface side of the substrate 1 is not irradiated with the active light beam except for the portion of the through hole 2, and only a portion of the photosensitive resin composition for forming a columnar member (resin layer 3A for forming a columnar member), which matches with the through hole 2, is exposed. On the other hand, the entire other surface side of the substrate 1 is exposed, and a portion in the through hole 2 and the entire portion laminated on the other surface of the substrate 1 of the resin composition for forming a transparent member (resin layer 5A for forming a transparent member) are photocured.

Then, an uncured portion of the photosensitive resin composition for forming a columnar member (resin layer 3A for forming a columnar member) is developed and removed. This leaves the cured portion of the photosensitive resin composition for forming a columnar member (resin layer 3A for forming a columnar member), which matches with the through hole 2, to form the columnar member 3 which protrudes from the inside of the through hole 2 toward the outside of the one surface of the substrate 1. Further, the transparent member 5 is formed on the other surface of the substrate 1 (see FIG. 7(c) and FIG. 8(c)).

Note that, a method of developing and removing the uncured portion is not particularly limited, and the uncured portion has only to be removed with a solvent or an alkaline solution.

(Second and Third Steps)

Next, as the second step, similarly to the case of the first embodiment, the photosensitive resin composition for forming a lens member is laminated on the one surface side of the substrate 1, and then, the substrate 1 is irradiated with an active light beam from the other surface side. Here, as described above, the active light beam passes through only the portion of the through hole 2, and only a portion of the photosensitive resin composition for forming a lens member, which matches with the through hole 2, is cured. After that, similarly to the case of the first embodiment, by developing and removing the uncured portion, the columnar member 6A for forming a lens member is formed only on the columnar member 3 (see FIG. 7(d) and FIG. 8(d)). Then, in a method similar to the third step of the first embodiment, the columnar member 6A for forming a lens member is caused to drip (thermally sag) to become the lens member 6. Thus, the substrate 20 with a lens of this embodiment is obtained (see FIG. 7 (e) and FIG. 8 (e)).

As described above, also in this embodiment, similarly to the case of the first embodiment, by providing the lens member 6 on the columnar member 3, the lens surface of the lens member 6 can be arranged at an arbitrary height from the surface of the substrate 1, and the lens can be easily formed into a desired shape.

Further, the through hole 2 is filled with the transparent member 5 and the columnar member 3 without avoid, and thus, irrespective of the kind of the substrate 1, an optical signal can pass through the through hole 2 and the lens member 6 can collimate or concentrate the optical signal. Therefore, even when the substrate 1 is not a transparent substrate, the substrate 20 with a lens of the second embodiment enables optical communication with small optical loss. Further, by providing the through hole 2, the columnar member 3 and the lens member 6 can be aligned more easily.

Note that, in the first step of this production method, it is not necessary that the resin composition for forming a transparent member (resin layer 5A for forming a transparent member) be exposed to be cured simultaneously with the photosensitive resin composition for forming a columnar member (resin layer 3A for forming a columnar member), and may be cured before or after the photosensitive resin composition for forming a columnar member (resin layer 3A for forming a columnar member) is cured. Further, curing of the resin composition for forming a transparent member (resin layer 5A for forming a transparent member) is not limited to photocuring, and may also be thermosetting.

Note that, even when the substrate 1 transmits the active light beam, and, as in this embodiment, a substrate having a through hole formed therein is used, the photosensitive resin composition for forming a columnar member (resin layer 3A for forming a columnar member) may be exposed using a photomask. In this case, after the through hole is filled with the resin composition for forming a transparent member and the photosensitive resin composition for forming a columnar member, a photomask having an opening portion larger than at least the through hole is arranged on any one of the sides of the substrate, and a center of the opening portion and a center of the through hole are aligned with each other, followed by exposure. Thus, the formation can be carried out with regard to substantially only the portion of the through hole 2.

Note that, insofar as the opening portion in the photomask can be aligned with the columnar member, no specific problem arises whether the photomask is arranged on the same side as or on the opposite side to the surface on which the photosensitive resin composition for forming a lens member (columnar member 6A for forming a lens member) is formed.

Note that, in the production method described above, a case is described in which the transparent member 5 is laminated on the entire other surface of the substrate 1, but the transparent member 5 may be patterned as appropriate and laminated only on part of the other surface of the substrate 1.

Figure 9:
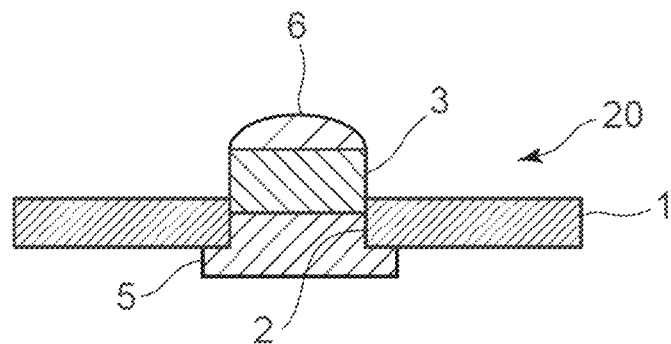
FIG. 9 is a sectional view illustrating a substrate with a lens according to a modified example of the second embodiment.

For example, as illustrated in FIG. 9, the transparent member 5 may be provided only at the portion at which the through hole 2 is formed and on the periphery thereof.

Figure 10:
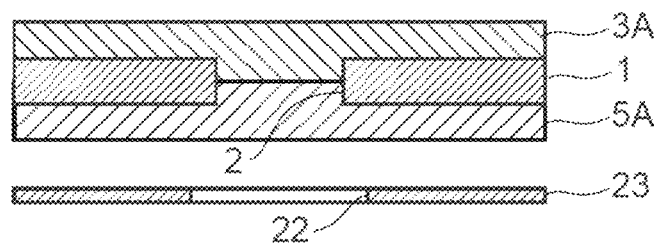
FIG. 10 is a section illustrating a step in a method of producing the substrate with a lens according to the modified example of the second embodiment.

In this case, it is preferred that the photosensitive resin composition for forming a columnar member (resin layer 3A for forming a columnar member) and the resin composition for forming a transparent member (resin layer 5A for forming a transparent member) be exposed under a state in which the substrate 1 is covered with a photomask 23 having an opening portion 22 larger than the through hole 2 from the other surface side as illustrated in FIG. 10. In this case, the opening portion 22 is opposed to the through hole 2, and the center of the opening portion 22 is caused to match with the center of the through hole 2.

When the resin composition for forming a transparent member (resin layer 5A for forming a transparent member) is exposed with the active light beam via the photomask 23 from the other surface side of the substrate 1, only a portion of the transparent member 5, which matches with the through hole 2, and a portion of the transparent member 5 on the periphery thereof are cured, and the rest is an uncured portion. On the other hand, the substrate 1 blocks the active light beam, and thus, with regard to the photosensitive resin composition for forming a columnar member, only a portion of the photosensitive resin composition for forming a columnar member (resin layer 3A for forming a columnar member), which matches with the through hole 2, is exposed.

Therefore, through the development and the removal after the exposure, the columnar member 3 and the transparent member 5 illustrated in FIG. 9 are obtained.

Figure 11:
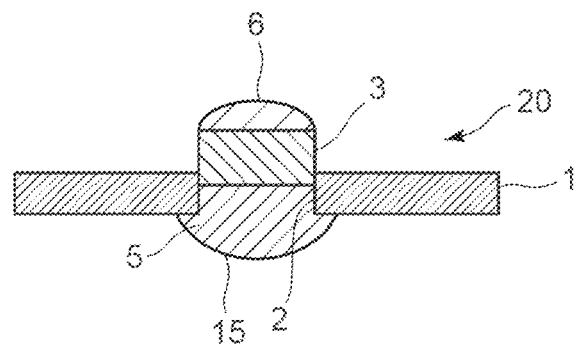
FIG. 11 is a sectional view illustrating a substrate with a lens according to a modified example of the second embodiment.

Further, the bottom surface of the transparent member 5 arranged outside the through hole 2 may be a convex lens surface 15 which bulges downward as illustrated in FIG. 11. This causes the substrate 1 to be a substrate with a biconvex lens. In this case, it is preferred that the transparent member 5 be formed of a photosensitive resin composition for forming a lens member, and be heated in the third step to be caused to drip together with the columnar member 6A for forming a lens member.

(Electrical Wiring)

Note that, in the first and second embodiments described above, electrical wiring may be provided on, for example, the one surface of the substrate 1, and the substrate 1 may be formed as an electrical wiring board with electrical wiring. The electrical wiring may be used for, for example, an electrode for mounting a light receiving/emitting element or an electrode for mounting a driver IC. A method of forming the electrical wiring is not particularly limited, and an ordinary method such as a semi-additive method, a subtractive method, or an additive method may be used. Further, metal plating of various kinds may be applied to a surface of the electrical wiring, and a resist 13 to be described later may be used as a plating resist.

(Resist)

Figure 12:
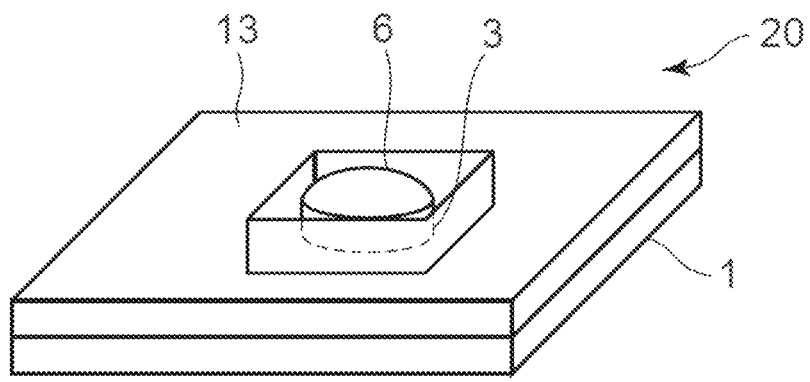
FIG. 12 is a perspective view illustrating the substrate with a lens in the first embodiment, which is provided with a resist.
Figure 13:
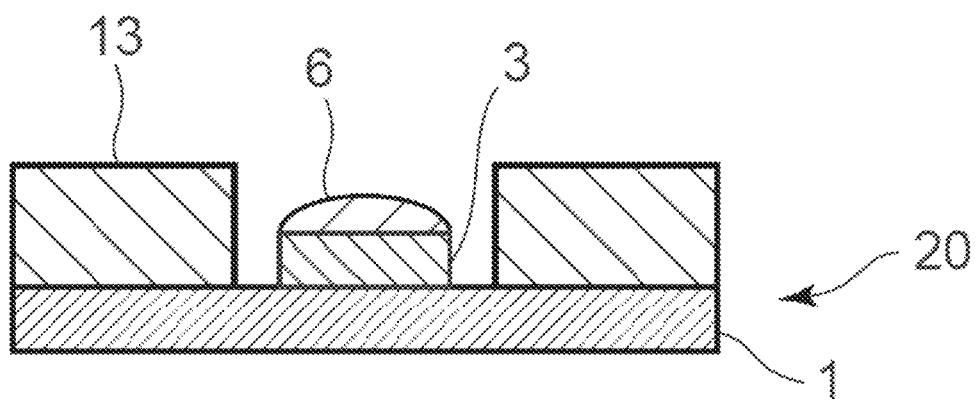
FIG. 13 is a sectional view illustrating the substrate with a lens of the first embodiment, which is provided with the resist.

Further, the resist 13 for protecting the lens member 6 may be provided side by side around the lens member 6 in the first and second embodiments described above. The shape of the resist 13 in plain view of the substrate 1 is not particularly limited, and may be any shape insofar as the shape does not interfere with an optical signal which passes through the lens. For example, forming the resist 13 on the one surface of the substrate 1 so as to surround the lens member 6 as illustrated in FIGS. 12 and 13 can reduce the possibility of damaging the lens member 6 during handling, which is thus preferred. The resist 13 is formed to have a height which is equal to or larger than a height from the one surface of the substrate 1 to a top of the lens member 6, and it is preferred that the resist have a height which is larger than the height to the top of the lens member 6. Further, the resist 13 may be used as a resist for protecting the electrical wiring or as a plating resist.

A method of forming the resist is not particularly limited, but it is good to carry out the method after the lens member 6 is formed, and the resist can be formed by a method of applying or bonding a photosensitive resin for forming a resist similarly to the case of the first step described above, and then carrying out photolithography processing. When the resist is formed by photolithography processing, the resist can be formed with high positional accuracy, which is more preferred.

Further, the resist may be formed simultaneously with the formation of the lens member 6 of the same photosensitive resin composition for forming a lens member. In this case, the resist may be a dummy lens having a lens shape.

<Optical Waveguide with Lens>

An optical waveguide with a lens can be produced by providing an optical waveguide 10 on the substrate with a lens of the present invention. An example in which the substrate with a lens according to the second embodiment is applied to an optical waveguide with a lens is described in the following with reference to FIG. 14.

The substrate 20 with a lens according to the second embodiment can use the transparent member 5 as a lower clad layer 7, and a core layer 8 and an upper clad layer 9 can be laminated thereon in succession to form the optical waveguide 10. By using the transparent member 5 as the lower clad layer of the optical waveguide, a thin optical waveguide 10 can be formed. With regard to the core layer 8, for example, a core pattern including a plurality of elongated cores is formed, and the core pattern is arranged so as to be embedded between the lower clad layer 7 and the upper clad layer 9. Further, a mirror 11 is provided for the optical waveguide 10, and the lens member 6 and the mirror 11 are provided at locations opposed to each other across the substrate 1.

According to the optical waveguide 10 with a lens, an optical signal which propagates through the core layer 8 changes an optical path thereof by the mirror 11, and after that, is concentrated by the convex lens surface of the lens member 6 to enter another optical member or the like. Thus, optical propagation can be carried out with small optical loss. Similarly, an optical signal which enters the convex lens surface of the lens member 6 from outside of the optical waveguide 10 with a lens changes, after being concentrated by the convex lens surface, an optical path thereof by the mirror 11 and propagates through the core layer 8, with reduced optical loss.

Figure 14:
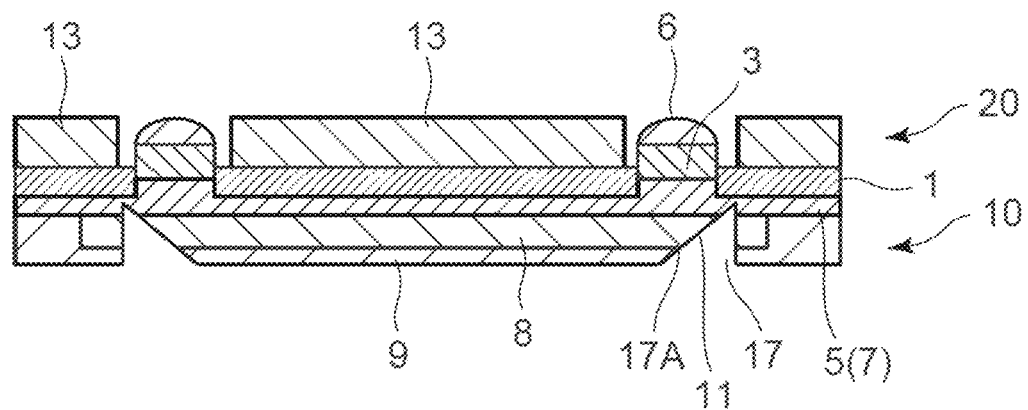
FIG. 14 is a sectional view illustrating an optical waveguide with a lens.

Note that, in this embodiment, a groove 17 which is triangular in section as illustrated in FIG. 14 is engraved from the upper clad layer 9 side of the optical waveguide 10 along a direction orthogonal to an axial direction of the core pattern, thereby forming a slanted surface 17A in the optical waveguide 10. The core embedded between the lower clad layer 7 and the upper clad layer 9 is exposed on the slanted surface 17A. The core forms the mirror 11, and the mirror 11 is provided in each of the grooves 17 so that the number of the mirrors 11 is the same as the number of the cores.

In this case, in the optical waveguide 10, the groove 17 is provided, for example, close to each of both end portions in a direction in which the core extends. Therefore, an optical path of an optical signal from the outside, which enters the lens member 6 on one end portion side of the optical waveguide 10, is changed by the mirror 11 on the one end portion side, the optical signal propagates through the core layer 8, and the optical path of the optical signal is changed again by the mirror 11 on the other end portion side. After that, the optical signal can enter another optical member or the like via the lens member 6 on the other end portion side. Note that, the substrate 20 with a lens illustrated in FIG. 14 includes the resist 13, but the resist 13 may be omitted.

The respective members used in the optical waveguide are described in further detail in the following.

(Lower Clad Layer and Upper Clad Layer)

As materials for the lower clad layer 7 and the upper clad layer 9, a resin composition for forming a clad layer or a resin film for forming a clad layer can be used.

The resin composition for forming a clad layer used in the present invention is not particularly limited insofar as the resin composition has a lower refractive index than that of the core and is curable by light or heat, and a thermosetting resin composition or a photosensitive resin composition can be suitably used. With regard to the resin composition used for the resin for forming a clad layer, the components contained in the resin composition may be the same or different and the refractive index of the resin composition may be the same or different between the lower clad layer and the upper clad layer.

According to the present invention, a method of forming the clad layers is not particularly limited, and the clad layers may be formed by, for example, applying the resin composition for forming a clad layer or laminating the resin film for forming a clad layer.

In the case of the applying, a method thereof is not limited, and the resin composition for forming a clad layer may be applied by an ordinary method.

Further, the resin film for forming a clad layer used in the laminating may be produced with ease by, for example, dissolving the resin composition for forming a clad layer in a solvent, applying the solution on a carrier film, and then removing the solvent.

The thicknesses of the lower clad layer and the upper clad layer are not particularly limited, but it is preferred that the thicknesses after drying be in a range of 5 to 500 µm. When the thickness is 5 µm or more, a clad thickness necessary for confining light can be secured. When the thickness is 500 µm or less, it is easy to control the thickness to be uniform. From the viewpoints described above, it is more preferred that the thicknesses of the lower clad layer and the upper clad layer be in a range of 10 to 100 µm.

(Core Layer)

As the core layer 8, a resin composition for forming a core layer or a resin film for forming a core layer can be used.

It is preferred that, as the resin composition for forming a core layer, one which is designed to have a higher refractive index than those of the lower clad layer and the upper clad layer, and which can form the core pattern by an active light beam be used. A method of forming the core layer before being patterned is not limited, and, for example, a method of applying the resin composition for forming a core layer by an ordinary method may be used.

A thickness of the resin film for forming a core layer is not particularly limited, and is ordinarily adjusted so that a thickness of the core layer after drying is 10 to 100 μm. When the thickness of the core layer after the film is completed is 10 μm or more, there is an advantage that an alignment tolerance can be increased in coupling to a light receiving/emitting element or an optical fiber after the optical waveguide is formed. When the thickness is 100 μm or less, there is an advantage that efficiency of coupling to a light receiving/emitting element or an optical fiber after the optical waveguide is formed is improved. From the viewpoints described above, it is more preferred that the thickness of the film be in a range of 30 to 90 μm, and, in order to obtain the thickness, the thickness of the film is adjusted as appropriate.

(Mirror)

As a method of forming the mirror, a publicly known method can be applied. For example, the mirror can be formed by cutting the core layer 8 using a dicing saw or the like from the side on which the upper clad layer 9 is formed. It is preferred that a slant angle of the mirror 11, that is, the slanted surface 17A, with respect to the axial direction of the core be 45°. Further, the mirror 11 may be provided with a reflective metal layer formed by vapor depositing a metal such as gold by using a vapor deposition apparatus.

[Method of Producing Optical Waveguide with Lens]

Figure 15:
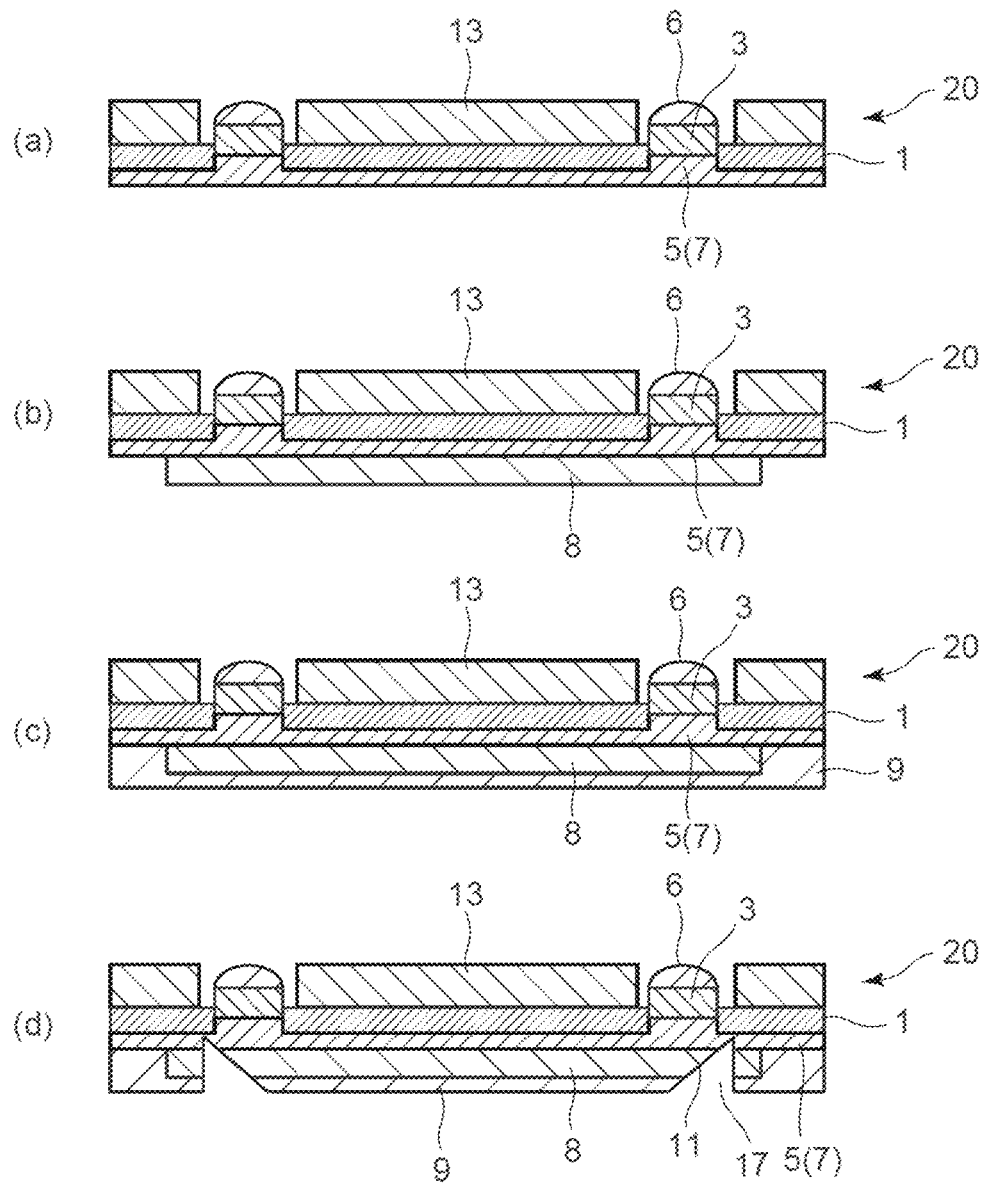
FIG. 15 are sectional views illustrating a method of producing the optical waveguide with a lens.

Next, a method of producing the optical waveguide with a lens is described with reference to FIG. 15.

In this production method, first, similarly to the case of the second embodiment, the substrate 20 with a lens is formed in which the transparent member 5 (lower clad layer 7) is provided on the other surface side of the substrate 1. Then, the core layer 8 and the upper clad layer 9 are laminated in succession on the lower clad layer 7, and the optical waveguide 10 is formed on the other surface side. After that, by forming the groove 17 in the optical waveguide 10, the mirror 11 is provided to obtain the optical waveguide with a lens.

However, the method of producing the optical waveguide with a lens is not limited thereto, and, for example, as in the first embodiment, the formation may be carried out by bonding an optical waveguide including the lower clad and upper clad layers and the core layer and provided with the mirror to a substrate with a lens not having a transparent member provided on the other surface side, or, the formation may be carried out by, after the optical waveguide is bonded, providing the mirror 11 in the optical waveguide 10. Further, the formation may also be carried out by, after the lower clad layer 7, the core layer 8, and the upper clad layer 9 are laminated in succession on the other surface of the substrate with a lens of the first embodiment to form the optical waveguide 10, providing the mirror 11.

Note that, the substrate with a lens and the optical waveguide with a lens described above may be integrated with an optical member of various kinds such as a light receiving element or a light emitting element to form an optical module.

[Curved Surface Shape Pattern]

In this specification, the description above is made with regard to a lens, but the above-mentioned "lens" can be replaced by "curved surface shape pattern" and the above-mentioned "for forming a lens member" can be replaced by "for forming a curved surface shape pattern" to enlarge the definitions in interpreting the invention.

A curved surface shape pattern 16 in the present invention refers to a pattern having a curved surface formed on the substrate 1, and includes the columnar member 3 and a curved surface shape pattern (corresponding to the lens member 6 described above) formed on the columnar member 3. The lens member 6 of the present invention is a kind (part) of the curved surface shape pattern (see FIG. 17 (*d*)).

Other than the lens member, for example, an optical waveguide in which the columnar member 3 is a clad layer having a low refractive index and a portion corresponding to the lens member 6 is a core layer having a high refractive index corresponds to the curved surface shape pattern of the present invention. By linearly forming a clad layer having a low refractive index and a core layer having a high refractive index in this way, an optical axis is substantially in the shape of a circle in section, and, for example, an optical fiber which is circular in section or an optical waveguide having a circular light receiving/emitting portion and having a low coupling loss with a photodiode or a laser diode can be obtained.

Further, as another example of such an optical waveguide, an optical waveguide in which a portion corresponding to the columnar member 3 and the lens member 6 having a higher refractive index than that of a clad layer is formed on the clad layer as a core pattern can obtain a similar effect.

As another example, there is given an electrical wiring board formed by forming a conductive layer on the substrate 1, forming the curved surface shape pattern 16 as a plating resist, carrying out electroplating, forming electrical wiring, and then removing the substrate and the conductive layer and further removing the plating resist. In this embodiment, using the curved surface shape pattern 16 has an advantage over a rectangular pattern in that the substrate, the conductive layer, and the plating resist can be removed more easily.

Note that, also in the case of the curved surface shape pattern, a resin composition similar to that described above can be used, but, when the curved surface shape pattern does not propagate light, transparency of the resin is unnecessary.

[Method of Producing Curved Surface Shape Pattern and Resin Film for Forming Curved Surface Shape Pattern]

The present invention encompasses a method of producing a curved surface shape pattern including a step (A') of laminating a resin layer for forming a columnar member and a resin layer for forming a curved surface shape in this order to form a laminate, a step (B) of etching the resin layer for forming a columnar member and the resin layer for forming a curved surface shape to form a laminated convex portion of the columnar member and a member for forming a curved surface shape, and a step (C') of heating the member for forming a curved surface shape to cause dripping, thereby forming a curved surface, and a resin film for forming a curved surface shape pattern which includes a laminate of a resin layer for forming a curved surface shape and a resin layer for forming a columnar member.

[Resin Film for Forming Curved Surface Shape Pattern]

It is preferred to use a resin film for forming a curved surface shape pattern including a laminate of a resin layer 14A for forming a curved surface shape and the resin layer 3A for forming a columnar member of the present invention in order to form the lens member and the curved surface shape pattern of the present invention because production thereof is easy. It is enough that the resin film includes the resin layer 14A for forming a curved surface shape, which drips (thermally sag) by heat, and the resin layer 3A for forming a columnar member, which does not drip (thermally sag) by heat. Further, the resin film may be a laminate in which one surface of the resin layer 14A for forming a curved surface shape that drips (thermally sags) is altered by light, heat, or the like so as not to drip (thermally sag), so that part thereof becomes the resin layer 3A for forming a columnar member. In particular, formation by applying one of the resin layer 14A for forming a curved surface shape, which thermally sags by heat, and the resin layer 3A for forming a columnar member, which does not thermally sag, onto the other thereof, or by bonding the resin layers prepared in advance to each other is preferred, because control of thicknesses thereof is easy.

In the resin film for forming a curved surface shape pattern of the present invention, it is preferred that a support film be laminated on the side of the resin layer for forming a curved surface shape and a protective film be laminated on the side of the resin layer for forming a columnar member. Any one of the support film and the protective film may be laminated, or both of them may be laminated (see FIG. 16(b)).

When a support film 12 is laminated on the side of the resin layer 14A for forming a curved surface shape of the laminate described above, handling of the laminate is easy, which is preferred, and, intimate contact with the photomask via the support film 12 in the exposure enables exposure without contamination of the photomask, which is preferred. From these viewpoints, it is preferred that the support film 12 be transparent with respect to an exposure wavelength to an extent that patterning by the exposure is not hindered.

Further, when the protective film is laminated on the side of the resin layer 3A for forming a columnar member of the laminate described above, contamination of a surface of the resin can be inhibited, which is preferred. Further, it is preferred that the support film 12 and the protective film (not shown) be formed using films of different thicknesses or materials. This enables easy discrimination inside between the resin layer for forming a curved surface shape and the resin layer for forming a columnar member. Further, when separating power between the support film and the resin layer for forming a curved surface shape is stronger than separating power between the protective film and the resin layer for forming a columnar member, the protective film can be easily separated, and thus, the side of the resin layer for forming a columnar member to be bonded can be easily exposed, which reduces the possibility of a mistake in determining the surface to be bonded and which is thus preferred. Whether the separating power is strong or weak can be determined by pulling the support film and the protective film simultaneously to see on which of the films the resin laminate remains, and remaining on the support film side is preferred.

Note that, a resin layer for forming a curved surface shape and a member for forming a curved surface shape in the present invention respectively refer to a resin layer for forming a lens or a curved surface shape pattern and a columnar member for forming a lens or a curved surface shape pattern before the thermal sagging. A lens member refers to a portion having the function of changing an angle of light to inhibit spread of the light or collimating or concentrating the light.

Next, a method of producing a substrate with a lens of the present invention, which can be suitably produced when the resin film for forming a curved surface shape pattern described above is used, is described with reference to FIG. 16 and FIG. 17. Specifically, the method of producing the substrate with a lens includes a step (A) of laminating a substrate, a resin layer for forming a columnar member, and a resin layer for forming a curved surface shape in this order to form a laminate, a step (B) of etching the resin layer for forming a columnar member and the resin layer for forming a curved surface shape to form a laminated convex portion of the columnar member and a member for forming a curved surface shape, and a step (C) of heating the member for forming a curved surface shape to cause dripping thereof, thereby forming a lens member.

[Step (A)]

Figure 16:
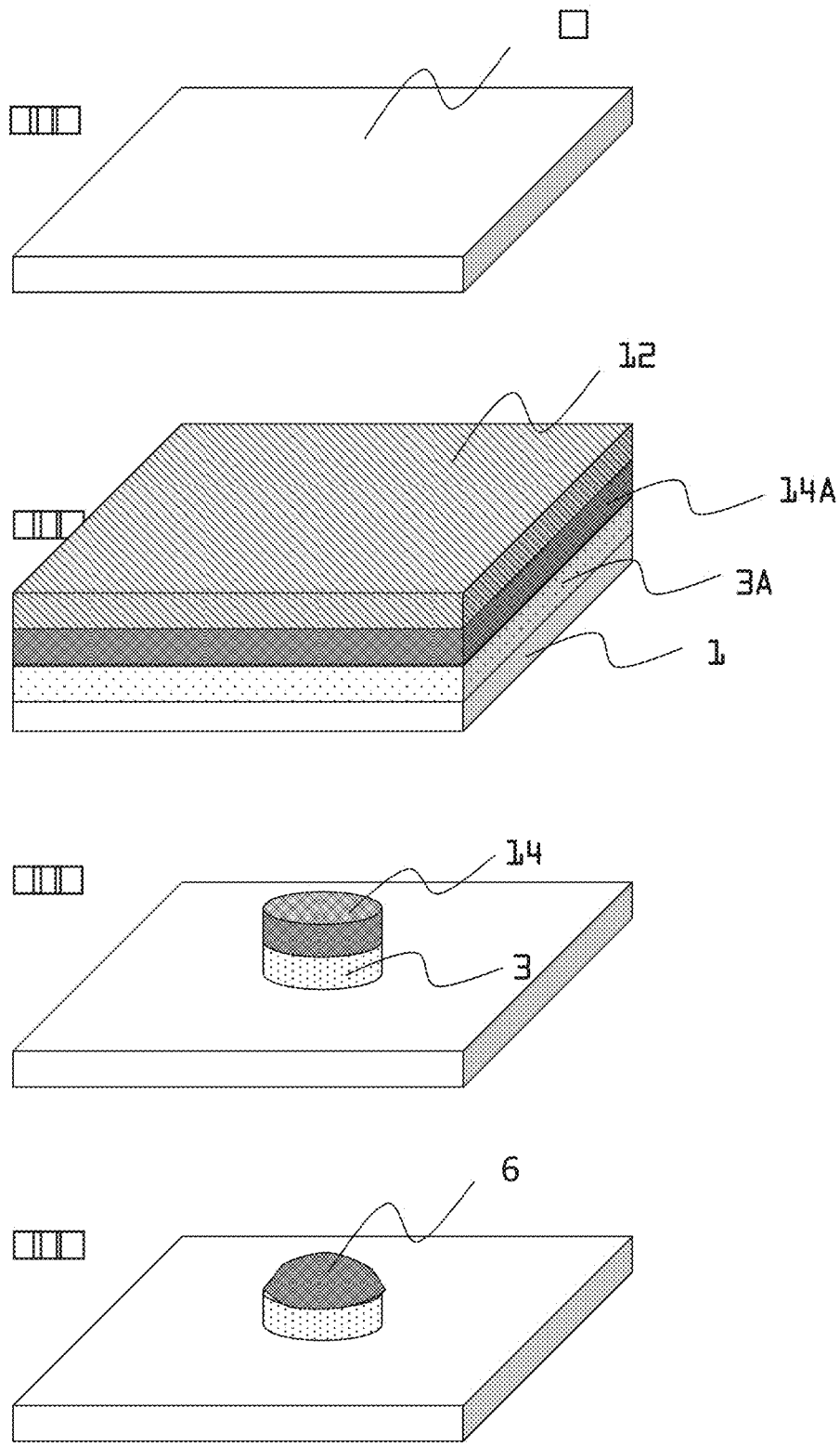
FIG. 16 are perspective views illustrating a method of producing the substrate with a lens of the present invention.
Figure 17:
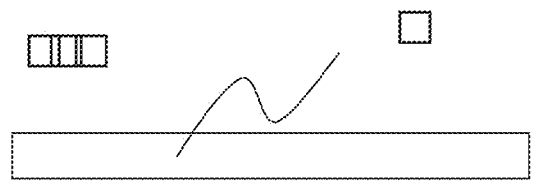
FIG. 17 are sectional views illustrating the method of producing the substrate with a lens of the present invention.
Figure 17:
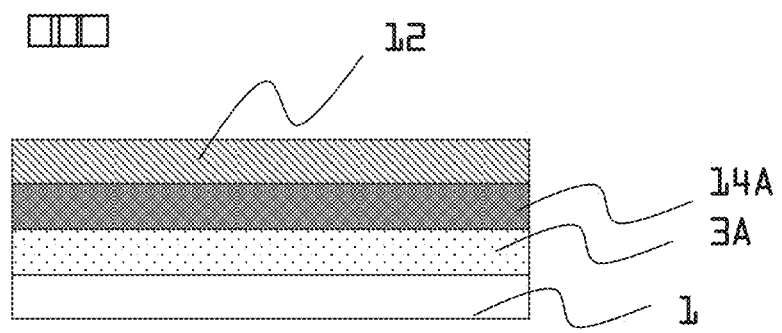
Figure 17:
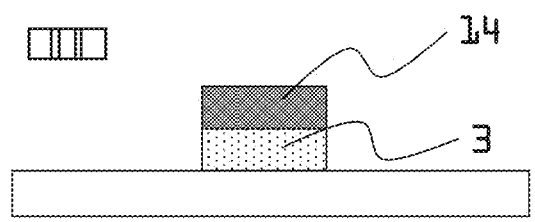
Figure 17:
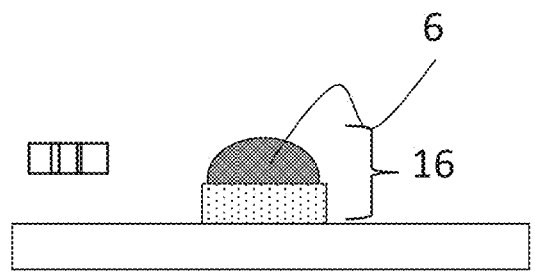

In the present invention, as the step (A), the substrate 1, the resin layer 3A for forming a columnar member, and the resin layer 14A for forming a curved surface shape are laminated in the order of the substrate 1, the resin layer 3A for forming a columnar member, and the resin layer 14A for forming a curved surface shape to form the laminate (see FIG. 16(b) and FIG. 17 (b), note that, the support film is omitted here). A method of forming the laminate is not particularly limited, and examples thereof include a method of applying on the substrate 1 in succession the resin layer 3A for forming a columnar member in a varnish state and the resin layer 14A for forming a curved surface shape in a varnish state using a comma coater, die coater, spin coater, or the like, a method of laminating in succession the resin layer 3A for forming a columnar member in a film state (dry film) and the resin layer 14A for forming a curved surface shape in a film state (dry film) using a roll laminator, a vacuum roll laminator, a vacuum laminator, an atmospheric press, a vacuum press, or the like, a method of applying one of the resins in a varnish state and laminating the other resin in a film state using the methods described above, and a method of, after the laminate of the resin layer 3A for forming a columnar member and the resin layer 14A for forming a curved surface shape is formed, carrying out laminating so that the resin layer 3A for forming a columnar member is on the substrate 1 side using the methods described above.

Among the methods described above, the method of using the resin layer 3A for forming a columnar member in a film state and the resin layer 14A for forming a curved surface shape in a film state does not need a drying step after varnish application, which is preferred. The method of, after the laminate of the resin layer 3A for forming a columnar member and the resin layer 14A for forming a curved surface shape is formed, carrying out laminating so that the resin layer 3A for forming a columnar member is on the substrate 1 side is more preferred, and this method can reduce the number of laminations on the substrate 1.

[Step (B)]

In the present invention, as the step (B), the resin layer 3A for forming a columnar member and the resin layer 14A for forming a curved surface shape are preferably simultaneously etched to form the laminate (laminated convex portion) of the columnar member 3 and the member 14 for forming a curved surface shape (see FIG. 16 (c) and FIG. 17 (c)).

As an etching method, dry etching such as reactive ion etching (RIE) or wet etching in which a solvent or an alkaline solution is used to dissolve the resin or swelling and removing the resin can be used. A method of, before carrying out the dry etching or the wet etching, forming an etching resist pattern which is not etched or which is less liable to be etched on the columnar member 3 and the member 14 for forming a curved surface shape, removing portions of the resin layer 3A for forming a columnar member and the resin layer 14A for forming a curved surface shape without the etching resist pattern, and, after that, removing the etching resist pattern may also be used. In the case of wet etching, as the resin layer 3A for forming a columnar member and the resin layer 14A for forming a curved surface shape, resins which can be etched by a solvent or an alkaline solution may be used.

Photocuring the columnar member 3 and the member 14 for forming a curved surface shape in part with an active light beam and carrying out wet etching is another wet etching method. In this case, when at least the resin layer 14A for forming a curved surface shape is a photosensitive resin layer, the member 14 for forming a curved surface shape substitutes for an etching resist and the laminate of the columnar member 3 and the member 14 for forming a curved surface shape can be formed. When this method is used, a step of forming the etching resist pattern on the resin layer 14A for forming a curved surface shape and a step of removing the etching resist pattern are unnecessary, which is preferred.

It is more preferred that the resin layer 3A for forming a columnar member be also a photosensitive resin layer. This clarifies contrast between an uncured portion to be removed by the etching and a photocured portion to be the columnar member 3, and can inhibit shaving off of a side surface of the columnar member 3. Thus, a laminate of the columnar member 3 and the member 14 for forming a curved surface shape of a same shape is easier to obtain. In this case, when the columnar member 3 and the member 14 for forming a curved surface shape are exposed simultaneously, the number of steps for the exposure can be reduced and the formation can be carried out without misalignment between the columnar member 3 and the member 14 for forming a curved surface shape, which is more preferred.

[Step (C)]

In the present invention, as the step (C), the member 14 for forming a curved surface shape is heated to cause dripping (thermal sagging), thereby forming the lens member 6 or the curved surface shape pattern 16 (laminated pattern with the columnar member 3) (see FIG. 16 (d) and FIG. 17 (d)). The member 14 for forming a curved surface shape is formed on the columnar member 3, and thus, even if viscosity thereof is lowered after the dripping (thermal sagging), remains on the columnar member 3 due to surface tension. Thus, the lens member 6 or the curved surface shape pattern 16 can be satisfactorily obtained irrespective of the kind and the surface roughness of the substrate 1. A temperature for causing the dripping (thermal sagging) is not particularly limited insofar as the viscosity of the member 14 for forming a curved surface shape is lowered and a curved surface is formed at the temperature, and is preferably 40° C. to 270° C., more preferably 80° C. to 230° C. The temperature is most preferably 80° C. to 180° C. from the viewpoint of maintaining transparency of the lens member 6 and the columnar member 3. After the dripping (thermal sagging), heat for curing the lens member 6 and the columnar member 3 may be applied. The temperature may be the same as or higher than the temperatures described above, but is most preferably 80° C. to 180° C. from the viewpoint of maintaining transparency of the lens member 6 and the columnar member 3.

EXAMPLES

Hereinafter, the present invention is more specifically described by way of Examples. However, the present invention is not limited by Examples without departing from the gist of the present invention.

Example 1

A substrate with a mirror corresponding to the first embodiment was produced and evaluated by the following procedures. Note that, in Example 1, 20 lens members 6 were provided on the substrate 1.

[Production of Resin Film for Forming Clad Layer]

<(A) Base Polymer; Production of (Meth)Acrylic Polymer (A-1)>

46 Parts by mass of propylene glycol monomethyl ether acetate and 23 parts by mass of methyl lactate were weighed in a flask provided with a stirring machine, a cooling tube, a gas-introducing tube, a dropping funnel, and a temperature gauge, and were stirred while a nitrogen gas was introduced. The temperature of the resultant liquid was increased to 65° C., and a mixture of 47 parts by mass of methyl methacrylate, 33 parts by mass of butyl acrylate, 16 parts by mass of 2-hydroxyethylmethacrylate, 14 parts by mass of methacrylic acid, 3 parts by mass of 2,2'-azobis(2,4-dimethylvaleronitrile), 46 parts by mass of propylene glycol monomethyl ether acetate, and 23 parts by mass of methyl lactate was dropped to the liquid over 3 hours. After that, the resultant mixture was stirred at 65° C. for 3 hours, and was further continuously stirred at 95° C. for 1 hour to provide a solution of a (meth)acrylic polymer (A-1) (solid content: 45 mass %).

(Measurement of Weight-Average Molecular Weight)

The weight-average molecular weight of the (A-1) (in terms of standard polystyrene) was measured with a GPC ("SD-8022", "DP-8020", and "RI-8020" manufactured by TOSOH CORPORATION). As a result, the weight-average molecular weight was $3.9 \times 10^4$. Note that, a "Gelpack GL-A150-S" and "Gelpack GL-A160-S" manufactured by Hitachi Chemical Company, Ltd. were used as columns.

(Measurement of Acid Value)

The acid value of the (A-1) was measured. As a result, the acid value was 79 mgKOH/g. Note that, the acid value was calculated from the amount of a 0.1 mol/L aqueous solution of potassium hydroxide needed for neutralizing the solution of the (A-1). At this time, the amount of the solution in which the color of phenolphthalein added as an indicator, which had been initially colorless, changed to a pink color was defined as a point of neutralization.

<Preparation of Resin Varnish for Forming Clad Layer>

84 Parts by mass (solid content: 38 parts by mass) of the solution of the (A-1) (solid content: 45 mass %) as (A) a base polymer, 33 parts by mass of urethane (meth)acrylate having a polyester skeleton ("U-200AX" manufactured by Shin Nakamura Chemical Co., Ltd.) and 15 parts by mass of urethane (meth)acrylate having a polypropylene glycol skeleton ("UA-4200" manufactured by Shin Nakamura Chemical Co., Ltd.) as (B) photocuring components, 20 parts by mass (solid content: 15 parts by mass) of a solution of a polyfunctional block isocyanate obtained by protecting an isocyanurate-type trimer of hexamethylene diisocyanate with methyl ethyl ketone oxime (solid content: 75 mass %) ("Sumidur BL3175" manufactured by Sumika Bayer Urethane Co., Ltd.) as (C) a thermosetting component, 1 part by mass of 1-[4-(2-hydroxyethoxy)phenyl]-2-hydroxy-2-methyl-1-propan-1-one ("IRGACURE 2959" manufactured by BASF Japan Ltd.) and 1 part by mass of bis(2,4,6-trimethylbenzoyl)phenylphosphine oxide ("IRGACURE 819" manufactured by BASF Japan Ltd.) as (D) photopolymerization initiators, and 23 parts by mass of propylene glycol monomethyl ether acetate as an organic solvent for dilution were mixed while being stirred. The mixture was filtered with a polyflon filter having a pore diameter of 2 μm ("PF020" manufactured by Advantec Toyo Kaisha, Ltd.) under pressure and then defoamed under reduced pressure to provide a resin varnish for forming a clad layer.

<Production of Resin Film for Forming Clad Layer>

The resin varnish for forming a clad layer obtained in the foregoing was applied onto the untreated surface of a PET film ("COSMOSHINE A4100" manufactured by Toyo Boseki K.K., thickness: 50 μm) as a carrier film with a coater (Multicoater TM-MC manufactured by HIRANO TEC-SEED Co., Ltd.), and was dried at 100° C. for 20 minutes. After that, a surface release-treated PET film ("Purex A31" manufactured by Teijin DuPont Films, thickness: 25 μm) as a cover film was attached to the resultant to provide a resin film for forming a clad layer.

The thickness of the resin film for forming a clad layer can be arbitrarily adjusted by regulating the gap of the coater, and is described in Examples. The thickness of the resin film for forming an upper clad layer to be described in Examples is a thickness after the application.

[Production of Resin Film for Forming Core Layer]

A resin varnish B for forming a core layer was prepared in the same manner as in the above-mentioned production example and under the same conditions as those of the production example except that 26 parts by mass of a phenoxy resin (trade name: PHENOTOHTO YP-70, manufactured by Tohto Kasei Co., Ltd.) as (A) a base polymer, 36 parts by mass of 9,9-bis[4-(2-acryloyloxyethoxy)phenyl]fluorene (trade name: A-BPEF, manufactured by Shin Nakamura Chemical Co., Ltd.) and 36 parts by mass of a bisphenol A-type epoxy acrylate (trade name: EA-1020, manufactured by Shin Nakamura Chemical Co., Ltd.) as (B) photopolymerizable compounds, 1 part by mass of bis(2,4,6-trimethylbenzoyl)phenylphosphine oxide (trade name: IRGACURE 819, manufactured by BASF Japan Ltd.) and 1 part by mass of 1-[4-(2-hydroxyethoxy)phenyl]-2-hydroxy-2-methyl-1-propan-1-one (trade name: IRGACURE 2959, manufactured by BASF Japan Ltd.) as (C) photopolymerization initiators, and 40 parts by mass of propylene glycol monomethyl ether acetate as an organic solvent were used. After that, the varnish was filtered under pressure and defoamed under reduced pressure in the same manner as in the production example and under the same conditions as those of the production example.

The resin varnish B for forming a core layer obtained in the foregoing was applied onto the untreated surface of a PET film (trade name: COSMOSHINE A1517, manufactured by Toyo Boseki K.K., thickness: 16 μm) as a carrier film and dried in the same manner as in the production example. Next, a release PET film (trade name: Purex A31, Teijin DuPont Films, thickness: 25 μm) as a cover film was attached to the resultant so that its release surface was on a resin side. Thus, a resin film for forming a core layer was obtained. At this time, the thickness of the resin layer can be arbitrarily adjusted by regulating the gap of the coater, and the thickness of the resin film for forming a core layer used in this example is described in Examples. The thickness of the resin film for forming a core layer to be described in Examples is a thickness after the application.

<Production of Photosensitive Resin (Film) for Forming Lens Member>

190 Parts by mass of propylene glycol monomethyl ether acetate were loaded into a flask provided with a stirring machine, a reflux condenser, an inert gas-introducing port, and a temperature gauge, and the temperature of the contents was increased to 80° C. under a nitrogen gas atmosphere. While a reaction temperature was kept at 80° C., 10 parts by mass of methacrylic acid, 1 part by mass of n-butyl methacrylate, 74 parts by mass of benzyl methacrylate, 15 parts by mass of 2-hydroxyethyl methacrylate, and 2.5 parts by mass of 2,2'-azobis(isobutyronitrile) were uniformly dropped to the contents over 4 hours. After the completion of the dropping, the mixture was continuously stirred at 80° C. for 6 hours to provide a solution of a binder polymer (a) having a weight-average molecular weight of about 30,000 (solid content: 35 mass %).

Next, 8 parts by mass of 2,2-bis(4-(di(meth)acryloxypolyethoxy)phenyl)propane, 22 parts by mass of β-hydroxyethyl-8'-(meth)acryloyloxyethyl-o-phthalate, 2.1 parts by mass of a 2-(o-chlorophenyl)-4,5-diphenylimidazole dimer, 0.33 part by mass of N,N'-tetraethyl-4,4'-diaminobenzophenone, 0.25 part by mass of mercaptobenzimidazole, 8 parts by mass of (3-methacryloylpropyl)trimethoxysilane, and 30 parts by mass of methyl ethyl ketone were added to 200 parts by mass (solid content: 70 parts by mass) of the solution of the binder polymer (a) (solid content: 35 mass %), and the contents were mixed with the stirring machine for 15 minutes to produce a solution of a photosensitive resin composition for forming a lens member.

A polyethylene terephthalate film having a thickness of 16 μm was used as a carrier film, the solution of the photosensitive resin composition for forming a lens member obtained in the foregoing was uniformly applied onto the carrier film with a comma coater, and its solvent was removed by drying the solution with a hot air convection-type drier at 100° C. for 3 minutes. Thus, a resin layer 6 for forming a lens member was formed. The thickness of the photosensitive resin composition (film) for forming a lens member used in this example is described in Examples. The thickness of the photosensitive resin composition for forming a lens member to be described in Examples is a thickness after the application.

Next, a polyethylene terephthalate film having a thickness of 25 μm as a cover film was further attached onto the resultant resin layer 6 for forming a lens member to produce a photosensitive resin film for forming a lens member.

[First Step; Formation of Columnar Member]

The cover film was peeled from the resin film for forming a clad layer having a thickness of 25 μm obtained in the foregoing as a resin film for forming a columnar member. After that, the remaining film was placed on a polyimide film measuring 150 mm by 150 mm (polyimide; UPILEX RN (manufactured by UBE-NITTO KASEI CO., LTD.), thickness; 25 μm). After that, a vacuum pressure-type laminator (MVLP-500 manufactured by MEIKI CO., LTD.) was evacuated to a vacuum of 500 Pa or less, and then the films were laminated with the laminator by being subjected to thermocompression bonding under the conditions of a pressure of 0.4 MPa, a temperature of 110° C., and a pressing time of 30 seconds.

Subsequently, the laminate was irradiated with UV light (wavelength: 365 nm), which was emitted from a UV exposure machine (model name: EXM-1172, manufactured by ORC MANUFACTURING CO., LTD.), at 0.3 J/cm$^2$ from a side closer to a surface having attached thereto the resin film for forming a clad layer through a negative photomask having a circular opening portion having a diameter of 210 μm. After that, the carrier film was peeled, and the remainder was etched with an aqueous solution of potassium carbonate containing 1.0 mass % of a developer and dried at 170° C. for 1 hour to form the columnar member 3 (see FIG. 3 (*b*) and FIG. 4 (*b*)).

[Second Step; Formation of Columnar Member for Forming Lens Member]

The cover film was peeled from the photosensitive resin film for forming a lens member having a thickness of 50 μm obtained in the foregoing. After that, a vacuum pressure-type laminator (MVLP-500 manufactured by MEIKI CO., LTD.) was evacuated to a vacuum of 500 Pa or less, and then the remainder was laminated from the side closer to the surface having formed thereon the columnar member 3 with the laminator by being subjected to thermocompression bonding under the conditions of a pressure of 0.4 MPa, a temperature of 110° C., and a pressing time of 30 seconds.

Subsequently, the laminate was irradiated with UV light (wavelength: 365 nm), which was emitted from a UV exposure machine (model name: EXM-1172, manufactured by ORC MANUFACTURING CO., LTD.), at 0.3 J/cm² from the side closer to the surface having formed thereon the photosensitive resin film for forming a lens member through a negative photomask having a circular opening portion having a diameter of 200 μm while the opening portion was aligned with the top of the columnar member 3.

After that, the carrier film of the photosensitive resin film for forming a lens member was peeled, and the remainder was etched with an aqueous solution of potassium carbonate containing 1.0 mass % of a developer to form the columnar member 6A for forming a lens member (see FIG. 3(c) and FIG. 4(c)).

[Third Step; Formation of Lens Member]

After that, the resultant was etched with an aqueous solution of potassium carbonate containing 1.0 mass % of a developer and heated at 180° C. for 1 hour to cause the columnar member 6A for forming a lens member to drip (thermally sag). Thus, the lens member 6 was formed on the columnar member 3 (see FIG. 3(d) and FIG. 4(d)).

[Formation of Resist]

The cover film was peeled from the resin film for forming a clad layer having a thickness of 56 μm obtained in the foregoing as a resin film for forming a resist. After that, the remaining film was placed on a polyimide film measuring 150 mm by 150 mm (polyimide; UPILEX RN (manufactured by UBE-NITTO KASEI CO., LTD.), thickness; 25 μm). After that, a vacuum pressure-type laminator (MVLP-500 manufactured by MEIKI CO., LTD.) was evacuated to a vacuum of 500 Pa or less, and then the films were laminated with the laminator by being subjected to thermocompression bonding under the conditions of a pressure of 0.4 MPa, a temperature of 110° C., and a pressing time of 30 seconds.

Subsequently, the laminate was irradiated with UV light (wavelength: 365 nm), which was emitted from a UV exposure machine (model name: EXM-1172, manufactured by ORC MANUFACTURING CO., LTD.), at 0.3 J/cm² from a side closer to a surface having formed thereon a clad layer through a negative photomask having a square light-shielding portion 300 μm on a side. After that, the carrier film was peeled, and the remainder was etched with an aqueous solution of potassium carbonate containing 1.0 mass % of a developer and dried at 170° C. for 1 hour to form the resist 13 for protecting a lens (see FIG. 12 and FIG. 13).

[Evaluation]

A section of the obtained substrate with a lens was observed. The lens member 6 had a diameter of 210 μm and a height of 30 μm, and the convex lens surface had a radius of curvature of 200 μm. Further, the columnar member 3 had a height of 25 μm, and an upper surface thereof (surface in contact with the lens member 6) was flat. On the other hand, the resist 13 had a height from the one surface of the substrate of 56 μm.

Further, a GI-50 multi-mode optical fiber as an optical fiber for receiving light was placed at a location opposed to the lens member 6, a GI-62.5 multi-mode optical fiber as an optical fiber for emission was placed at a location opposed to the columnar member 3, and an optical signal of 850 nm emitted from the optical fiber for emission was received by the optical fiber for receiving light via the substrate 1, the columnar member 3, and the lens member 6. Light propagation loss at that time was measured. When a distance between tips of the optical fibers was 100 μm, the light propagation loss was 0.48 dB. When the distance between the tips of the optical fibers was 200 μm, the light propagation loss was 0.56 dB. The optical signal was able to be satisfactorily transmitted.

Example 2

The substrate with a lens was produced in a method similar to that of Example 1, except that the thickness of the resin film for forming a columnar member was 50 μm, the thickness of the resin film for forming a lens member was 75 μm, and the thickness of the resist was 81 μm.

[Evaluation]

A section of the obtained substrate with a lens was observed. The lens member 6 had a diameter of 210 μm and a height of 30 μm, and the convex lens surface had a radius of curvature of 200 μm. Further, the columnar member 3 had a height from the one surface of the substrate of 50 μm, and the upper surface thereof was flat. On the other hand, the resist 13 had a height from the one surface of the substrate of 81 μm.

Example 3

The substrate with a lens was produced in a method similar to that of Example 1, except that an electrical wiring board in which a Cu electrode was formed by a subtractive method on the one surface of the substrate 1 was used. The substrate 1 had a surface roughness Ra of 1.5 μm.

[Evaluation]

A section of the obtained substrate with a lens was observed. The lens member 6 had a diameter of 210 μm and a height of 30 μm, and the convex lens surface had a radius of curvature of 200 μm. Further, the columnar member 3 had a height of 25 μm, and the upper surface thereof was flat. On the other hand, the resist 13 had a height from the one surface of the substrate of 56 μm.

Comparative Example 1

The substrate with a lens was produced in a method similar to that of Example 3, except that the columnar member 3 was not formed, the thickness of the resin film for forming a lens member was 25 μm, and the thickness of the resist was 31 μm.

[Evaluation]

A section of the obtained substrate with a lens was observed. The lens member 6 had a diameter of 250 μm and a height of 20 μm. The radius of curvature exhibited variation.

Example 4

[Production of Substrate with Through Hole]

As the substrate 1, a through hole having a diameter of 210 μm was formed in a polyimide film measuring 150 mm by 150 mm (manufactured by UBE-NITTO KASEI CO., LTD., trade name; UPILEX RN, thickness; 25 μm) by drill processing to obtain a substrate with a through hole (see FIG. 7(a) and FIG. 8(a)).

[First Step; Formation of Columnar Member]

As the resin for forming a transparent member and the resin for forming a columnar member, the resin films for forming a clad layer produced above were used. The cover films were peeled from the respective resin films for forming a clad layer having a thickness of 25 µm. After that, a vacuum pressure-type laminator (MVLP-500 manufactured by MEIKI CO., LTD.) was evacuated to a vacuum of 500 Pa or less. After that, on both surfaces of the obtained substrate 1, the remaining films were laminated with the laminator by being subjected to thermocompression bonding under the conditions of a pressure of 0.4 MPa, a temperature of 110° C., and a pressing time of 30 seconds, thereby filling the through hole 2 with the resin for forming a transparent member and the resin for forming a columnar member, and at the same time, laminating the resin for forming a transparent member on the one surface of the substrate 1 and laminating the resin for forming a columnar member on the other surface thereof (see FIG. 7(*b*) and FIG. 8(*b*)).

Then, the side closer to the surface of the resin for forming a transparent member was covered with a negative photomask having a square opening portion in 5 mm on a side and having a center aligned with the center of the through hole 2, and UV light (wavelength: 365 nm) of 0.3 J/cm² was radiated via the photomask from a side closer to the surface of the resin for forming a transparent member using the UV exposure machine described above (see FIG. 10). The UV light passed through the opening portion to be radiated to the resin for forming a transparent member. In the substrate, the UV light passed through only the through hole to be radiated to the resin for forming a columnar member.

Then, carrier films of the resin film for forming a transparent member and of the resin film for forming a columnar member were peeled, and the remainders were etched with an aqueous solution of potassium carbonate containing 1.0 mass % of a developer and dried at 170° C. for 1 hour to produce the substrate 1 with the transparent member 5 and the columnar member 3.

[Second Step; Formation of Columnar Member for Forming Lens Member]

In the second step, similarly to the case of Example 1, the photosensitive resin film for forming a lens member was laminated on the one surface side of the substrate. Then, UV light (wavelength: 365 nm) of 0.3 J/cm² was radiated to the substrate 1 from the transparent member 5 side using the UV exposure machine described above. The UV light passed through only the portion at which the through hole was provided, and only a portion of the photosensitive resin film for forming a lens member, which matched with the through hole, was cured.

After that, a carrier film of the photosensitive resin film for forming a lens member was peeled, and then, similarly to the case of Example 1, the remainder was etched to form on the columnar member 3 the columnar member 6A for forming a lens member.

[Third Step; Formation of Lens Member]

After that, similarly to the case of Example 1, the third step was carried out to form the lens member 6 on the columnar member 3, and further, the resist (not shown) was also formed to obtain the substrate with a lens (see FIG. 9).

[Evaluation]

As a result of observation of the obtained substrate with a lens, the lens member 6 had a diameter of 210 µm and a height of 30.5 µm, and the upper surface thereof had a radius of curvature of 210 µm. On the other hand, the columnar member 3 had a height from the one surface of the substrate 1 of 25 µm, and the upper surface thereof was flat. Further, the resist had a height from the one surface of the substrate of 56 µm.

Further, similarly to the case of Example 1, the light propagation loss was measured. When a distance between tips of the optical fibers was 100 µm, the light propagation loss was 0.45 dB. When the distance between the tips of the optical fibers was 200 µm, the light propagation loss was 0.57 dB. The optical signal was able to be satisfactorily transmitted.

Example 5

The substrate with a lens was produced in a method similar to that of Example 4, except that the thickness of the resin film for forming a columnar member was 50 µm, the thickness of the resin film for forming a lens member was 75 µm, and the thickness of the resist was 81 µm.

[Evaluation]

A section of the obtained substrate with a lens was observed. The lens member 6 had a diameter of 210 µm and a height of 30.5 µm, and the convex lens surface had a radius of curvature of 210 µm. The columnar member 3 had a height from the one surface of the substrate of 50 µm, and the upper surface thereof was flat. On the other hand, the resist 13 had a height from the one surface of the substrate of 81 µm.

Example 6

The substrate with a lens was produced in a method similar to that of Example 4, except that an electrical wiring board in which a Cu electrode was formed by a subtractive method on the one surface of the substrate 1 was used. The substrate 1 had a surface roughness Ra of 1.5 µm.

[Evaluation]

A section of the obtained substrate with a lens was observed. The lens member 6 had a diameter of 210 µm and a height of 30.5 µm, and the convex lens surface had a radius of curvature of 210 µm. The columnar member 3 had a height from the one surface of the substrate of 25 µm, and the upper surface thereof was flat. The resist 13 had a height from the one surface of the substrate of 56 µm.

Example 7

The production was conducted in a method similar to that of Example 4, except that the resin film for forming a transparent member was the resin film for forming a lens member, and the opening portion in the negative photomask used for the exposure for forming the columnar member 3 was shaped so as to have a diameter of 300 µm. In the third step, the bottom surface of the transparent member was also formed into a convex lens surface by thermal sagging (see FIG. 11).

[Evaluation]

A section of the obtained substrate with a lens was observed. The lens member 6 had a diameter of 210 µm and a height of 30.5 µm, and the convex lens surface had a radius of curvature of 210 µm. The columnar member 3 had a height from the one surface of the substrate of 25 µm, and the upper surface thereof was flat. The resist 13 had a height from the one surface of the substrate of 56 µm. Further, the transparent member on the opposite surface to the surface having the columnar member 3 formed thereon was formed into a lens shape.

Comparative Example 2

The substrate with a lens was produced in a method similar to that of Example 6, except that the columnar member 3 was not formed, the thickness of the resin film for forming a lens member was 25 μm, and the thickness of the resist was 31 μm.

[Evaluation]

As a result of observation of the lens member 6, the diameter was 270 μm and a shape in section had a height of 20 μm. The radius of curvature exhibited variation.

Example 8

[Optical Waveguide with Lens]

The substrate with a lens was produced in a method similar to that of Example 4, except that the resin film for forming a transparent member was the resin film for forming a lens member, and the entire surface of the substrate 1 was exposed without using the negative photomask used for the exposure for forming the columnar member 3 (see FIG. 15(a)).

The resin film for forming a core layer having a thickness of 50 μm which was obtained as described above was, after a cover film thereof was peeled, laminated onto the transparent member 5 as the lower clad layer 7 formed as described above under the conditions of a pressure of 0.4 MPa, a temperature of 50° C., and a laminating speed of 0.2 m/min using a roll laminator (HLM-1500 manufactured by Hitachi Chemical Techno-plant Co., Ltd.). After that, the above-mentioned vacuum pressure-type laminator (MVLP-500 manufactured by MEIKI CO., LTD.) was evacuated to a vacuum of 500 Pa or less. After that, the laminate was subjected to thermocompression bonding under conditions of a pressure of 0.4 MPa, a temperature of 70° C., and a pressing time of 30 seconds using the vacuum pressure-type laminator to form the resin layer for forming a core.

Subsequently, the resultant was irradiated with UV light (wavelength: 365 nm) at 0.8 J/cm$^2$ from a carrier film side by using a negative photomask for forming a core pattern and the UV exposure machine, and was then exposed at 80° C. for 5 minutes, followed by heating. After that, the PET film as the carrier film was peeled, and the remainder was etched with a developer (containing propylene glycol monomethyl ether acetate and N,N-dimethylacetamide at a mass ratio of 8/2). Subsequently, the etched product was washed with a washing liquid (isopropanol) and dried under heat at 100° C. for 10 minutes to form the core pattern (core layer 8). Note that, each core was formed so as to pass portions above two through-holes (see FIG. 15 (b)).

[Formation of Upper Clad Layer]

The cover film was peeled from the resin film for forming a clad layer having a thickness of 55 μm obtained in the foregoing. After that, a vacuum pressure-type laminator (MVLP-500 manufactured by MEIKI CO., LTD.) was evacuated to a vacuum of 500 Pa or less. After that, from above the obtained core pattern, the remaining film was laminated with the laminator by being subjected to thermocompression bonding under the conditions of a pressure of 0.4 MPa, a temperature of 110° C., and a pressing time of 30 seconds.

Then, the resultant was irradiated with UV light (wavelength: 365 nm) at 3.0 J/cm$^2$ from the carrier film side of the resin film for forming a clad layer by using the UV exposure machine described above. After the carrier film was peeled, the remainder was exposed at 80° C. for 5 minutes, followed by heating. Thus, the upper clad layer 9 was formed (see FIG. 15(c)).

[Formation of Mirror]

The groove 17 having a triangular section was formed from the upper clad layer 9 side of the obtained optical waveguide by using a dicing saw (DAC552 manufactured by DISCO Inc.), thereby forming the mirror 11 which is slanted at 45° with respect to the axial direction of the core pattern to obtain the optical waveguide with a lens (see FIG. 15(d)).

[Measurement of Optical Loss]

An optical signal of 850 nm was caused to enter the mirror 11 via the lens member 6 using an optical fiber A (GI-50, NA=0.2). Optical loss (A) was measured when the optical signal which passed through the core pattern, was reflected by another mirror 11, and was output through another lens member 6 was received on a center point of the mirror using an optical fiber B (GI-50, NA=0.2). At this time, a distance between the surface of the substrate 1 and the optical fiber B was 30 μm. Then, the mirror 11 was cut using the dicing saw described above to obtain an optical waveguide without a mirror. Then, the optical fiber A and the optical fiber B described above were used, and the optical fiber A and the optical fiber B were provided so as to be aligned with the axial direction of the core pattern on a light entering portion side and a light outgoing portion side, respectively, and optical loss (B) was measured.

From the above, optical loss (C) of transmission from the mirror 11 to the lens member 6 was calculated in accordance with the following equation:

$$(C)=(A)-(B).$$

The optical loss (C) with regard to the optical waveguide with a lens obtained in Example 8 was 1.73 dB.

Example 9

The lens member illustrated in FIGS. 16 and 17 was produced in the following steps and was evaluated.

<Production of Resin Layer for Forming Columnar Member (Dry Film)>

As a resin varnish for forming a columnar member, the resin varnish for forming a clad layer obtained in Example 1 was used to produce the resin layer for forming a columnar member (dry film) in the following steps.

The resin varnish for forming a columnar member was applied onto the untreated surface of a PET film ("COSMOSHINE A4100" manufactured by Toyo Boseki K.K., thickness: 50 μm) as a support film (after being laminated with the resin layer for forming a curved surface shape described below, used as a protective film) with a coater (Multicoater TM-MC manufactured by HIRANO TECSEED Co., Ltd.), and was dried at 100° C. for 20 minutes. After that, a surface release-treated PET film ("Purex A31" manufactured by Teijin DuPont Films, thickness: 25 μm) as a protective film was attached to the resultant to provide a resin film for forming a clad layer.

The thickness of the resin layer 3A (film) for forming a columnar member can be arbitrarily adjusted by regulating the gap of the coater, and is described in Examples. The thickness of the resin film 3A for forming a columnar member in Examples is a thickness after the application and drying.

Further, as the resin layer 14A for forming a curved surface shape (dry film), the photosensitive resin (film) for forming a lens member of Example 1 was used.

<Production of Laminate of Resin Layer for Forming Curved Surface Shape and Resin Layer for Forming Columnar Member>

A protective film of the resin layer 14A for forming a curved surface shape at a thickness of 30 μm and a protective film of the resin layer 3A for forming a columnar member at a thickness of 25 μm were peeled, and the resin surfaces were laminated to each other under the conditions of a pressure of 0.4 MPa, a temperature of 40° C., and a laminating speed of 0.2 m/min using a roll laminator (HLM-1500 manufactured by Hitachi Chemical Techno-plant Co., Ltd.) to form the laminate of the resin layer for forming a curved surface shape and the resin layer for forming a columnar member. When the respective support films were peeled, the laminate remained on the support film on the side of the resin layer 14A for forming a curved surface shape. At this time, the support film on the side of the resin layer 3A for forming a columnar member was used as the protective film of the laminate of the resin layer 14A for forming a curved surface shape and the resin layer 3A for forming a columnar member.

[Step A]

The protective film was peeled from the laminate of the resin layer for forming a curved surface shape and the resin layer for forming a columnar member obtained as described above. After that, the remaining film was placed on a polyimide film measuring 150 mm by 150 mm (polyimide; UPILEX RN (manufactured by UBE-NITTO KASEI CO., LTD.), thickness; 25 μm). After that, a vacuum pressure-type laminator (MVLP-500 manufactured by MEIKI CO., LTD.) was evacuated to a vacuum of 500 Pa or less, and then the films were laminated with the laminator by being subjected to thermocompression bonding under the conditions of a pressure of 0.4 MPa, a temperature of 80° C., and a pressing time of 30 seconds (see FIG. 16(b) and FIG. 17 (b)).

[Step B]

Subsequently, the laminate was irradiated with UV light (wavelength: 365 nm), which was emitted from a UV exposure machine (model name: EXM-1172, manufactured by ORC MANUFACTURING CO., LTD.), at 0.3 J/cm² from the support film side through a negative photomask having a circular opening portion having a diameter of 210 μm. After that, the support film was peeled, and the remainder was etched with an aqueous solution of potassium carbonate containing 1.0 mass % of a developer and dried at 170° C. for 1 hour to form the laminate of the columnar member 3 and the member 14 for forming a curved surface shape (see FIG. 16(c) and FIG. 17(c)).

[Step C]

After that, heating was carried out at 180° C. for 1 hour to cause dripping (thermal sagging) of the member 14 for forming a curved surface shape to form the lens member 6 on the columnar member 3 (see FIG. 16 (d) and FIG. 17 (d)).

[Evaluation]

As a result of observation of the lens member 6, the diameter was 210 μm, a shape in section had a height of 30 μm, and the radius of curvature was 200 μm. A shape in section of the columnar member 3 side had a height from the plane of the substrate of 25 μm and was flat. An optical signal of 850 nm was caused to enter from the columnar member 3 side using a GI-50 multi-mode optical fiber for the light entering portion. When a GI-62.5 multi-mode optical fiber for the light receiving portion on the lens member 6 side was provided so that the distance between tips of the optical fibers was 100 μm, the light propagation loss was 0.45 dB. When the distance between the tips of the optical fibers was 200 μm, the light propagation loss was 0.53 dB. The optical signal was able to be satisfactorily transmitted.

Example 10

The protective film was peeled from the resin layer 3A for forming a columnar member having a thickness of 25 μm obtained as described above. After that, a vacuum pressure-type laminator (MVLP-500 manufactured by MEIKI CO., LTD.) was evacuated to a vacuum of 500 Pa or less. Then, the remaining film was subjected to thermocompression bonding using the laminator on a polyimide film measuring 150 mm by 150 mm (polyimide; UPILEX RN (manufactured by UBE-NITTO KASEI CO., LTD.), thickness; 25 μm) under conditions of a pressure of 0.4 MPa, a temperature of 80° C., and a pressing time of 30 seconds. Then, the protective film was peeled from the resin layer 14A for forming a curved surface shape having a thickness of 30 μm. After that, the above-mentioned vacuum pressure-type laminator was evacuated to a vacuum of 500 Pa or less. Then, the remaining film was subjected to thermocompression bonding using the laminator on the resin layer 3A for forming a columnar member with the support film being peeled therefrom under the conditions of a pressure of 0.4 MPa, a temperature of 80° C., and a pressing time of 30 seconds. The exposing and subsequent steps were similar to those of Example 1, and the lens member 6 on the columnar member 3 was formed.

[Evaluation]

As a result of observation of the lens member 6, the diameter was 210 μm, a shape in section had a height of 30 μm, and the radius of curvature was 200 μm. A shape in section of the columnar member 3 side had a height from the plane of the substrate of 25 μm and was flat. An optical signal of 850 nm was caused to enter from the transparent member 5 side using a GI-50 multi-mode optical fiber for the light entering portion. When a GI-62.5 multi-mode optical fiber for the light receiving portion on the lens member 6 side was provided so that the distance between tips of the optical fibers was 100 μm, the light propagation loss was 0.46 dB. When the distance between the tips of the optical fibers was 200 μm, the light propagation loss was 0.51 dB. The optical signal was able to be satisfactorily transmitted.

Comparative Example 3

The substrate with a lens was produced in a method similar to that of Example 9, except that the columnar member 3 was not formed and the thickness of the resin layer for forming a curved surface shape was 25 μm.

[Evaluation]

As a result of observation of the lens member 6, the diameter was 250 μm and a shape in section had a height of 20 μm. The radius of curvature exhibited variation.

INDUSTRIAL APPLICABILITY

According to one embodiment of the present invention, it is possible to provide the substrate with a lens that can, while arbitrarily selecting a height of the lens, form the lens in a uniform and desired shape, thereby enabling reduction of a distance between the lens and another optical member and reduction of a pitch of the lens.

The invention claimed is:

1. A method of producing a substrate with a lens, comprising:
    a first of forming a columnar member on one surface of a substrate wherein the substrate comprises a substrate comprising a through hole, and
    wherein the first step comprises:
        laminating a photosensitive resin composition for forming a columnar member from the one surface side of the substrate, and at the same time, filling the through hole, and laminating a resin composition for forming a transparent member from another surface side of the substrate, and at the same time, filling the through hole;

exposing and curing a portion of the photosensitive resin composition for forming a columnar member, which matches with the through hole, and photocuring or thermosetting the resin composition for forming a transparent member; and developing and removing an uncured portion of the photosensitive resin composition for forming a columnar member to form the columnar member protruding from an inside of the through hole toward an outside of the one surface of the substrate;

a second step of laminating, on the one surface side of the substrate, a photosensitive resin composition for forming a lens member to arrange the photosensitive resin composition for forming a lens member on the columnar member and on the substrate, and curing by exposure the photosensitive resin composition for forming a lens member on the columnar member to form a lens member on the columnar member; and a third step of heating the columnar member for forming a lens member to cause dripping thereof, thereby forming an upper surface thereof into a convex lens surface.

2. A method of producing a substrate with a lens according to claim 1, wherein the first step comprises arranging a mask having an opening portion at a location opposed to the through hole on another surface side of the substrate, and radiating an active light beam from the another surface side via the mask to expose and cure the photosensitive resin composition for forming a columnar member.

3. A method of producing a substrate with a lens according to claim 1, wherein the substrate exhibits light shielding performance against an active light beam in exposing the photosensitive resin composition for forming a columnar member, and wherein the first step comprises radiating the active light beam from another surface side of the substrate to expose and cure a portion of the photosensitive resin composition for forming a columnar member, which matches with the through hole.

4. A method of producing a substrate with a lens according to claim 1, wherein the second step comprises arranging a mask having an opening portion at a location opposed to the through hole on another surface side of the substrate, and radiating an active light beam from the another surface side via the mask to expose and cure the photosensitive resin composition for forming a lens member.

5. A method of producing a substrate with a lens according to claim 1, wherein the substrate exhibits light shielding performance against an active light beam in exposing the photosensitive resin composition for forming a lens member, and wherein the second step comprises radiating the active light beam from the another surface side of the substrate to expose and cure a portion of the photosensitive resin composition for forming a lens member, which matches with the through hole.

6. A method of producing a substrate with a lens according to claim 1, wherein the resin composition for forming a transparent member comprises a photosensitive resin composition.

* * * * *